United States Patent [19]
Konishi et al.

[11] Patent Number: 5,420,635
[45] Date of Patent: May 30, 1995

[54] VIDEO CAMERA, IMAGING METHOD USING VIDEO CAMERA, METHOD OF OPERATING VIDEO CAMERA, IMAGE PROCESSING APPARATUS AND METHOD, AND SOLID-STATE ELECTRONIC IMAGING DEVICE

[75] Inventors: Masahiro Konishi; Makoto Tsugita; Masafumi Inuiya, all of Tokyo; Kazuyuki Masukane, Kurokawa, all of Japan

[73] Assignee: Fuji Photo Film Co., Ltd., Kanagawa, Japan

[21] Appl. No.: 936,845

[22] Filed: Aug. 28, 1992

[30] Foreign Application Priority Data

Aug. 30, 1991 [JP] Japan .................................. 3-244090
Aug. 30, 1991 [JP] Japan .................................. 3-244091

[51] Int. Cl.6 ............................................. H04N 5/238
[52] U.S. Cl. ................................... 348/362; 348/371; 348/229
[58] Field of Search ................ 358/228, 227, 209; 354/400; H04N 5/225, 5/238; 348/207, 220, 216, 231, 229, 362, 364, 366, 371

[56] References Cited

U.S. PATENT DOCUMENTS 4,819,075  4/1989  Imaide et al. ..................... 348/297
4,881,127  11/1989  Isoguchi et al. ............... 358/213.19
5,101,276  3/1992  Ohta et al. ..................... 358/213.19

FOREIGN PATENT DOCUMENTS 60-136480  7/1985  Japan .
  639378   6/1986  Japan ........................... H04N 5/92

Primary Examiner—Michael T. Razavi
Assistant Examiner—Tuan V. Ho

[57] ABSTRACT

A suitable image is obtained of a subject in which the difference in luminance between a bright area and a dark area is very large. The dark area is properly exposed and first image data is obtained. The bright area is properly exposed, and second image data is obtained. The first image data pertaining to the bright area is replaced with the second image data, thereby obtaining composite image data. This is accomplished using an array of photodiodes comprising two sets of photodiodes, one set of the photodiodes comprising filters, and the respective sets of photodiodes output signals to respectively different transfer paths for signal processing.

22 Claims, 25 Drawing Sheets

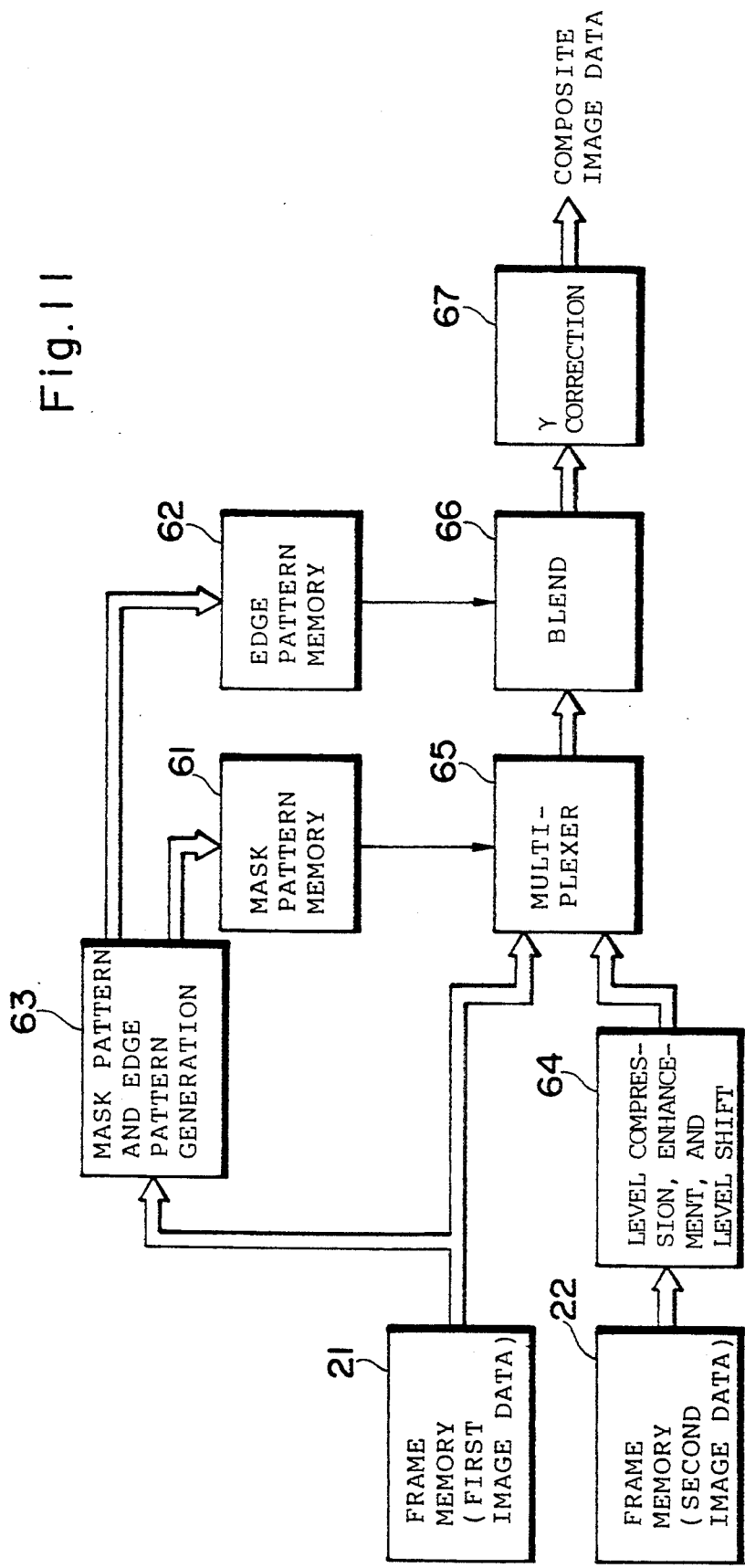

VIDEO CAMERA, IMAGING METHOD USING VIDEO CAMERA, METHOD OF OPERATING VIDEO CAMERA, IMAGE PROCESSING APPARATUS AND METHOD, AND SOLID-STATE ELECTRONIC IMAGING DEVICE

BACKGROUND OF THE INVENTION

Field of the Invention

The present invention relates to a video camera (including a movie video camera, a still video camera, a movie/still video camera, and the like), an imaging method using the video camera, a method of operating the video camera, an image processing apparatus and method, and a solid-state electronic imaging device.

Description of the Related Art

A video camera contains a solid-state electronic imaging device such as a CCD (charge-coupled device) for generating a video signal representing an image of a subject picked up. The dynamic range of the solid-state electronic imaging device is relatively narrow. When the difference in luminance between a bright portion and a dark portion included in a visual field is large, therefore, it is difficult to pick up both the portions under proper exposure conditions. For example, if the exposure conditions are adjusted to the dark portion, the bright portion appears white. On the other hand, if the exposure conditions are adjusted to the bright portion, the dark portion appears black.

Examples are a case where in imaging against the light, the background is very bright and a main subject in the center is dark, and a case where in imaging in a room with a window, a main subject is in the room and a bright scene of the outdoors is seen through the window. In such imaging of a scene, when the exposure conditions are so adjusted that a main subject (a person in many cases) is properly exposed, the amount of incident light exceeds the dynamic range of the solid-state electronic imaging device with respect to a bright background portion, so that the device is saturated. Accordingly, the bright background is not properly picked up, so that an image of the bright background portion merely appears white.

Therefore, measures have been generally taken to increase the luminance of a main subject by strobe flashing (daytime-synchroflash imaging, i.e., daytime imaging synchronous with strobe flashing). However, a strobo device is required for the daytime-synchroflash imaging, so that a camera is increased in size and the operation thereof is complicated. In addition, when the dark portion is in the distance or extends far from a short distance, the daytime-synchroflash imaging is not necessarily effective.

SUMMARY OF THE INVENTION

An object of the present invention is to obtain a suitable image signal with respect to a subject in which the difference in luminance between a bright area and a dark area is large even if the strobe is not necessarily flashed.

In order to attain the above described object, the present invention provides a video camera. The video camera includes a movie video camera, a still video camera, and a movie/still video camera.

The video camera according the present invention is defined as described in the following if it is comprehensively expressed.

That is, the video camera comprises imaging means for imaging a subject under two different (large and small) amounts of exposure and outputting image signals respectively representing two images obtained under the conditions of different amounts of exposure, and means for generating a composite image signal by replacing an image signal representing a relatively high luminance area in the image obtained under the conditions of a large amount of exposure with an image signal representing a corresponding area in the image obtained under the conditions of a small amount of exposure or by replacing an image signal representing a relatively low luminance area in the image obtained under the conditions of a small amount of exposure with an image signal representing a corresponding area in the image obtained under the conditions of a large amount of exposure.

The image signal is used as a signal including both an analog video signal and digital image data.

The video camera according to the present invention comprises, in one embodiment, means for respectively determining a proper amount of exposure for the relatively low luminance area and a proper amount of exposure for the relatively high luminance area in a visual field of the camera. The subject is picked up twice with the determined two types of amounts of exposure, respectively, by the above described imaging means.

In the video camera according to the present invention, in another embodiment, the above described imaging means comprises beam splitter means for dividing incident light in accordance with a predetermined ratio of the amounts of exposure, and two solid-state electronic imaging devices for respectively receiving two incident light beams obtained by the division by the beam splitter means to output image signals. According to the present embodiment, two image signals generated under the conditions of different amounts of exposure are obtained by imaging a subject once.

Particularly in an embodiment suitable for a movie/still video camera, the above described imaging means comprises a solid-state electronic imaging device for outputting an image signal representing an image of incident light, and means for driving the above described solid-state electronic imaging device so as to make the exposure time constant in an ordinary state and driving the solid-state electronic imaging device so as to make the exposure time shorter than the above described constant exposure time in response to a command to Generate a composite image. Consequently, it is possible to obtain an image signal for a still picture at a desired time point while imaging a moving picture.

The present invention is not for eliminating imaging by strobe flashing. It is possible to obtain two image signals Generated under the conditions of different amounts of exposure even by the strobe flashing.

The video camera according to the present invention further comprises, in one embodiment, strobe flashing means for emitting strobe light twice so as to result in suitable amounts of exposure respectively for two areas different distances away from the camera in the visual field of the camera.

As described above in various embodiments, it is possible to obtain image signals respectively representing two images picked up using different amounts of exposure.

Means for synchronizing image signals also has a lot many embodiments.

A description is now made of an embodiment in which images are synthesized by performing processing in a digital manner.

In one embodiment of the present invention, the above described composite image signal generating means comprises first storing means for storing a first image signal representing the image obtained under the conditions of a large amount of exposure, second storing means for storing a second image signal representing the image obtained under the conditions of a small amount of exposure, means for determining the relatively high luminance area in the image represented by the first image signal stored in the above described first storing means the relatively low luminance area in the image represented by the second image signal stored in the above described second storing means, and synthesizing means for synthesizing an image signal representing an area other than the high luminance area determined by the above described determining means in the first image signal and an image signal representing an area corresponding to the above described high luminance area in the second image signal or synthesizing an image signal representing an area other than the low luminance area determined by the above described determining means in the second image signal and an image signal representing an area corresponding to the above described low luminance area in the first image signal.

In a preferred embodiment, the above described determining means comprises third storing means for storing an area designation signal representing the determined area. In addition, the above described synthesizing means comprises switching means for selecting either one of the first and second image signals synchronously read out from the above described first and second storing means to output the same in accordance with the area designation signal read out from the third storing means.

The above described determining means comprises, in one embodiment, comparing means for comparing the above described first or second image signal with a predetermined threshold level.

The above described determining means comprises, in another embodiment, means for low-pass filtering the above described first or second image signal, and comparing means for comparing the image signal low-pass filtered with a predetermined threshold level. Consequently, a small bright point or the like on the image is excluded from an object of synthesis of images.

In still another embodiment, the above described determining means is realized as one for extracting an area of a relatively high luminance and having an area length of not less than a predetermined value in the image represented by the first image signal or an area of a relatively low luminance and having an area or length of not less than a predetermined value in the image represented by the second image signal. Consequently, a small bright point or the like is excluded from an object of synthesis of images, too.

In a preferred embodiment, the above described synthesizing means comprises means for generating, in the vicinity of the boundary appearing when the first image signal is partially replaced with the second image signal the second image signal is partially replaced with the first image signal (the boundary between the first image signal and the second image signal), a signal representing the weighted average value of both the image signals. Consequently, a boundary line of the images to be synthesized is smoothed, thereby to make it possible to achieve a natural impression.

In another embodiment, the above described synthesizing means comprises means for low-pass filtering, in the vicinity of the boundary between the first image signal and the second image signal, the image signals. Consequently, it is possible to remove an unnatural impression of a boundary line of the images to be synthesized.

A description is now made of an embodiment in which a composite image signal is generated in an analog manner.

In one embodiment of the present invention, the above described composite image signal generating means comprises a comparator for comparing a first analog video signal representing the image obtained under the conditions of a large amount of exposure with a predetermined threshold level to generate an output when the level of the first analog video signal exceeds the above described threshold level, and a multiplexer for receiving the above described first analog video signal and a second analog video signal applied in synchronization therewith and representing the image obtained under the conditions of a small amount of exposure, and selecting the above described first analog video signal to output the same in an ordinary state and selecting the above described second analog video signal to output the same when the output of the above described comparator is applied.

Preferably, there is further provided a low-pass filter for removing a high frequency component of the above described first analog video signal, an output of the low-pass filter being applied to the above described comparator.

More preferably, there are further provided a time width detecting circuit for applying an output signal of the above described comparator to the above described multiplexer when the time width of the output signal is not less than a predetermined reference width, and a delay circuit for delaying the above described first and second analog video signals for a time corresponding to the above described reference width to respectively apply the signals to the above described multiplexer.

A video camera according to the present invention is defined as described in the following if it is individually expressed.

In accordance with a first aspect of the present invention, a video camera which is suitable for the realization of a still video camera comprises means for respectively determining a proper amount of exposure for a relatively high luminance area and a proper amount of exposure for a relatively low luminance area in a visual field of the camera, imaging means including a solid-state electronic imaging device for imaging a subject twice using the determined two different amounts of exposure and respectively outputting video signals representing images obtained by the imaging from the above described solid-state electronic imaging device, analog-to-digital converting means for respectively converting the video signals outputted from the above described imaging means into digital image data corresponding thereto, first storing means for storing first digital image data obtained by the analog-to-digital conversion and representing the image obtained under the conditions of a large amount of exposure, second storing means for storing second digital image data obtained by the analog-to-digital conversion and representing the image obtained under the conditions of a small amount of exposure, means for extracting the relatively high luminance area in the image represented by the first image data stored in the first storing means, and image synthesizing means for generating composite image data by replacing image data representing the high luminance area extracted by the above described extracting means in the first digital image data with image data representing a corresponding area in the second digital image data stored in the second storing means.

In accordance with a second aspect of the present invention, a video camera which is suitable for the realization of a still video camera comprises strobe flashing means for emitting strobe light twice so as to result in suitable amounts of exposure respectively for two areas different distances away from the camera in a visual field of the camera, imaging means for imaging a subject twice in synchronization with the emission of strobe light by the above described strobe flashing means to respectively output video signals representing images obtained by the imaging, analog-to-digital converting means for converting the video signals outputted from the above described imaging means into digital image data corresponding thereto, first storing means for storing first digital image data obtained by the analog-to-digital conversion and representing one of the images, second storing means for storing second digital image data obtained by the analog-to-digital conversion and representing the other image, means for extracting a relatively high luminance area in the image represented by the first digital image data stored in the first storing means, and image synthesizing means for generating composite image data by replacing image data representing the high luminance area extracted by the above described extracting means in the first digital image data with image data representing a corresponding area in the second digital image data stored in the second storing means.

In accordance with a third aspect of the present invention, a video camera comprises beam splitter means for dividing incident light in accordance with a predetermined ratio of the amounts of exposure, and two solid-state electronic imaging devices for respectively receiving two incident light beams obtained by the division by the beam splitter means to output analog video signals. By imaging a subject once using this video camera, it is possible to obtain two analog video signals generated under the conditions of different amounts of exposure.

In accordance with a fourth aspect of the present invention, a video camera which can perform processing of a video signal in real time and is particularly suitable for the realization of a movie video camera comprises beam splitter means for dividing incident light in accordance with a predetermined Patio of the amounts of exposure, two solid-state electronic imaging devices for respectively receiving two incident light beams obtained by the division by the beam splitter means to output analog video signals, a comparator for comparing a first analog video signal outputted from the solid-state electronic imaging device subjected to a large amount of exposure with a predetermined threshold level to generate an output when the level of the first analog video signal exceeds the above described threshold level, and a multiplexer receiving the above described first analog video signal and a second analog video signal applied in synchronization therewith and outputted from the solid-state electronic imaging device subjected to a small amount of exposure, and selecting the above described first analog video signal to output the same in an ordinary state and selecting the above described second analog video signal to output the same when the output of the above described comparator is applied.

In a preferred embodiment, there is provided an automatic gain control amplifier circuit for adjusting the level of the above described second analog video signal.

In accordance with a fifth aspect of the present invention, a video camera which is suitable for the realization of a movie/still video camera comprises imaging means including a solid-state electronic imaging device for outputting video signals each representing an image of a subject in a constant cycle, a shutter release button for feeding a request for a composite still image, means for driving the above described solid-state electronic imaging device so as to make the exposure time constant in an ordinary state and driving the above described solid-state electronic imaging device so as to make the exposure time shorter than the above described constant exposure time in response to the request for the composite still image from the shutter release button, and means for sequentially recording on a magnetic tape the video signals outputted from the above described solid-state electronic imaging device.

In accordance with a sixth aspect of the present invention, a video camera which is similarly suitable for the realization of a movie/still video camera comprises imaging means including a solid-state electronic imaging device for outputting video signals each representing an image of a subject in a constant cycle, a shutter release button for feeding a request for a composite still image, means for driving the above described solid-state electronic imaging device so as to make the exposure time constant in an ordinary state and driving, when the request for the composite still image is fed from the above described shutter release button, the above described solid-state electronic imaging device so as to make the exposure time equal to the above described constant exposure time with respect to imaging of a first image immediately after the request is fed and make the exposure time shorter than the above described constant exposure time with respect to imaging of a second image subsequent to the first image, analog-to-digital converting means for converting the video signals outputted from the above described solid-state electronic imaging device into digital image data corresponding thereto, first storing means for storing the digital image data obtained by the analog-to-digital conversion and representing the above described first image, second storing means for storing the digital image data obtained by the analog-to-digital conversion and representing the above described second image, image synthesizing means for outputting composite image data by replacing image data representing a relatively high luminance area in the first image represented by the digital image data stored in the first storing means with image data representing a corresponding area in the second image represented by the digital image data stored in the second storing means, first modulating means for modulating the video signal outputted from the above described solid-state electronic imaging device (in general, frequency-modulating a luminance signal and subjecting a color difference signal to low frequency conversion), second modulating means for pulse code-modulating the composite image data obtained from the above described image synthesizing means, and means for respectively recording a signal outputted from the above described first modulating means on a video track of a magnetic tape and a signal outputted from the above described second modulating means on a PCM track of the magnetic tape a predetermined length at a time.

In accordance with a seventh aspect of the present invention, a video camera which is suitable for the realization of a movie video camera and a movie/still video camera comprises imaging means including a solid-state electronic imaging device for outputting an image signal representing an image of a subject, movement detecting means for determining whether or not the subject is moved by not less than a predetermined amount on the basis of the image signal obtained from the imaging means, means for so controlling the amount of exposure that the above described imaging means images the subject using two different amounts of exposure on a condition that the movement is not detected by the above described movement detecting means, and means for Generating a composite image signal by replacing an image signal representing a relatively high luminance area in an image obtained under the conditions of a large amount of exposure with an image signal representing a corresponding area in an image obtained under the conditions of a small amount of exposure.

In a preferred embodiment, the above described video camera further comprises high luminance area detecting means for determining whether or not the area of the relatively high luminance area in the image obtained under the conditions of a large amount of exposure is not less than a predetermined area. The above described exposure controlling means so controls the amount of exposure that the subject can be imaged using the two different amounts of exposure on a condition that the movement is not detected by the above described movement detecting means and the high luminance area is detected by the above described high luminance area detecting means.

As described in the foregoing, in the video camera according to the present embodiment, only portions suitably exposed of two image signals picked up using two different amounts of exposure are extracted and are synthesized. Accordingly, an image represented by an image signal obtained by the synthesis appears neither white nor black even if it is an image of a subject in which the difference in luminance between two portions is very large, thereby a very excellent image is obtained. In addition, even when strobe flashing is used, both portions nearer and farther away from the camera are so expressed as to have approximately the same luminance.

The present invention further provides an imaging method using a video camera.

An imaging method according to the present embodiment uses a video camera having a solid-state electronic imaging device for outputting a video signal representing an image of a subject picked up and means for adjusting the amount of exposure in the solid-state electronic imaging device, and comprises the steps of setting a suitable amount of exposure for a relatively low luminance area in a visual field of the camera to perform first imaging, and setting a suitable amount of exposure for a relatively high luminance area to perform second imaging. Preferably, video signals obtained by performing the first and second imaging or digital image data obtained by analog-to-digital conversion of the video signals are separately recorded on recording means.

Another imaging method according to the present invention uses a video camera having a first solid-state electronic imaging device for outputting a video signal representing an image of a subject picked up and means for adjusting the amount of exposure in the first solid-state electronic imaging device, and comprises the steps of providing with a second solid-state electronic imaging device and beam splitter means for dividing incident light in accordance with a predetermined ratio of the amounts of exposure to lead incident light beams obtained by the division into the above described first and second solid-state electronic imaging devices, and simultaneously imaging the subject using two different amounts of exposure by the above described first and second solid-state electronic imaging devices.

In the imaging method according to the present invention, it is possible to obtain, for two areas which largely differ in luminance, video signals imaged separately and respectively using suitable amounts of exposure, and to use the video signals for the above described synthesis of images.

The present invention further provides a method of operating a video camera. This operating method comprises the steps of imaging a subject using two different amounts of exposure to obtain image signals respectively representing two images generated under the conditions of different amounts of exposure, and generating a composite image signal by replacing an image signal representing a relatively high luminance area in the image obtained under the conditions of a large amount of exposure with an image signal representing a corresponding area in the image obtained under the conditions of a small amount of exposure or by replacing an image signal representing a relatively low luminance area in the image obtained under the conditions of a small amount of exposure with an image signal representing a corresponding area in the image obtained under the conditions of a large amount of exposure.

The operating method according to one embodiment comprises the steps of respectively determining a proper amount of exposure for the relatively high luminance area and a proper amount of exposure for the relatively low luminance area in a visual field of the camera, and imaging the subject twice using the determined two types of amounts of exposure to obtain two image signals generated under the conditions of different amounts of exposure.

The operating method according to another embodiment is suitable for a movie video camera and comprises the step of driving the solid-state electronic imaging device so as to make the exposure time constant in an ordinary state and driving the solid-state electronic imaging device so as to make the exposure time shorter than the above described constant exposure time in response to a command to generate a composite image to obtain two image signals generated under the conditions of different amounts of exposure.

In the foregoing, the movement of an image of the subject is preferably detected on the basis of the image signals obtained from the above described solid-state electronic imaging device, to continue to make exposure for the above described constant exposure time when the image of the subject is moved by not less than a constant amount. Consequently, it is possible to avoid the synthesis of images which are shifted from each other by the movement of the subject.

The operating method for imaging by using strobe flashing comprises the step of emitting strobe light twice so as to result in suitable amounts of exposure respectively for two areas different distances away from the camera in the visual field of the camera to obtain two image signals generated under the conditions of different amounts of exposure.

Also in the method of operating a video camera according to the present embodiment, the subject is imaged using two different amounts of exposure, and only portions suitably exposed of the image signals obtained by the imaging are extracted and are synthesized. Accordingly, an image represented by an image signal obtained by the synthesis appears neither white nor black even if it is an image of a subject in which the difference in luminance between two portions is very large, thereby a very excellent image is obtained. In addition, even when strobe flashing is used, both portions nearer and farther away from the camera are so expressed as to have approximately the same luminance.

The present invention further provides an image processing apparatus and method.

An image processing apparatus according to the present embodiment comprises first storing means for storing first image data representing an image obtained under the conditions of a large amount of exposure, second storing means for storing second image data representing an image obtained under the conditions of a small amount of exposure, means for determining a relatively high luminance area in the image represented by the first image data stored in the first storing means or a relatively low luminance area in the image represented by the second image data stored in the second storing means, and synthesizing means for synthesizing image data representing an area other than the high luminance area determined by the above described determining means in the first image data and image data representing an area corresponding to the above described high luminance area in the second image data or synthesizing image data representing an area other than the low luminance area determined by the above described determining means in the second image data and image data representing an area corresponding to the above described low luminance area in the first image data.

An image processing method according to the present invention comprises the steps of applying image data respectively representing two images obtained under the conditions of different amounts of exposure by imaging a subject using the two different amounts of exposure, and generating composite image data by replacing image data representing a relatively high luminance area in the image obtained under the conditions of a large amount of exposure with image data representing a corresponding area in the image obtained under the conditions of a small amount of exposure or by replacing image data representing a relatively low luminance area in the image obtained under the conditions of a small amount of exposure with image data representing a corresponding area in the image obtained under the conditions of a large amount of exposure.

The image processing method according to the present embodiment comprises the steps of storing in first storing means first image data representing the image obtained under the conditions of a large amount of exposure, storing in second storing means second image data representing the image obtained under the conditions of a small amount of exposure, determining a relatively high luminance area in the image represented by the first image data stored in the first storing means or a relatively low luminance area in the image represented by the second image data stored in the second storing means, and generating composite image data by synthesizing image data representing an area other than the high luminance area determined by the above described determining means in the first image data and image data representing an area corresponding to the above described high luminance area in the second image data or by synthesizing image data representing an area other than the low luminance area determined by the above described determining means in the second image data and image data representing an area corresponding to the above described low luminance area in the first image data.

Some preferred embodiments of the image processing apparatus and method are the same as the embodiments of image synthesis processing in the above described video camera and hence, the description thereof is omitted.

In an image processing apparatus and method according to embodiments of the present invention, when two image signals obtained by imaging a subject using two different amounts of exposure are applied, only portions properly exposed are extracted and are synthesized. Accordingly, an image represented by an image signal obtained by the synthesis appears neither white nor black even with respect to a subject in which the difference in luminance between two portions is very large, thereby to obtain a very excellent image is obtained.

The basic concept of image inlaying synthesis according to the present embodiments is to pick up a subject using two different amounts of exposure to obtain two image signals respectively representing two images obtained under the conditions of different amounts of exposure and generate a composite image signal by replacing an image signal representing a relatively high luminance area of the image obtained under the conditions of a large amount of exposure with an image signal representing a corresponding area in the image obtained under the conditions of a small amount of exposure.

The present invention further provides a solid-state electronic imaging device capable of obtaining a suitable video signal with respect to a subject in which the difference in luminance between a bright area and a dark area is large, even if a strobe is not necessarily flashed. According to the solid-state electronic imaging device of the present embodiment, it is possible to obtain image signals representing two images generated under the conditions of different amounts of exposure which are utilized in the above described inlaying synthesis.

Particularly, there is provided a single chip solid-state electronic imaging device capable of obtaining two image signals generated under the conditions of different amounts of exposure without performing exposure twice.

According to a first aspect of the present embodiment, a solid-state electronic imaging device is provided comprising a plurality of photoelectric conversion elements arranged in the vertical direction and the horizontal direction for accumulating signal charge whose amount corresponds to the amount of incident light, filters provided on the above described photoelectric conversion elements arranged in the horizontal direction for each predetermined interval in the vertical direction for limiting the amount of light incident on the above described photoelectric conversion elements, vertical transfer portions provided adjacent to respective columns in the vertical direction of the above described photoelectric conversion elements for separately transferring a first signal charge accumulated in the photoelectric conversion elements provided with the above described filters and a second signal charge accumulated in the photoelectric conversion elements provided without any filters, respectively, in response to a transfer signal, a first horizontal transfer portion for transferring in the horizontal direction the above described first signal charge fed from the above described vertical transfer portions, and a second horizontal transfer portion for transferring in the horizontal direction the above described second signal charge fed from the above described vertical transfer portions.

In one embodiment of the present invention, there is further provided moving means for moving in the vertical direction all of the above described photoelectric conversion elements or the above described filters by one row of photoelectric conversion elements.

According to a second aspect of the present invention, a solid-state electronic imaging device is provided comprising a plurality of photoelectric conversion elements arranged in the vertical direction and the horizontal direction for accumulating signal charge whose amount corresponds to the amount of incident light, first filters provided on the above described photoelectric conversion elements arranged in the horizontal direction for each predetermined interval in the vertical direction and having a first transmittance to limit the amount of light incident on the above described photoelectric conversion elements, second filters provided on the above described photoelectric conversion elements provided without the above described first filters and having a second transmittance to limit the amount of light incident on the above described photoelectric conversion elements, vertical transfer portions provided adjacent to respective columns in the vertical direction of the above described photoelectric conversion elements for separately transferring a first signal charge accumulated in the photoelectric conversion elements provided with the above described first filters and a second signal charge accumulated in the photoelectric conversion elements provided with the above described second filters, respectively, in response to a transfer signal, a first horizontal transfer portion for transferring in the horizontal direction the above described first signal charge fed from the above described vertical transfer portions, and a second horizontal transfer portion for transferring in the horizontal direction the above described second signal charge fed from the above described vertical transfer portions.

In one embodiment of the present invention, there is further provided moving means for moving in the vertical direction all of the above described photoelectric conversion elements or the above described first filters and the above described second filters by one row of photoelectric conversion elements.

According to the first aspect of the present embodiment, the photoelectric conversion elements provided with filters and the photoelectric conversion elements provided without any filters exist. The first signal charge accumulated in the photoelectric conversion elements provided with filters and the second signal charge accumulated in the photoelectric conversion elements provided without any filters are separately transferred through the vertical transfer portions. The first signal charge is obtained from the first horizontal transfer portion, and the second signal charge is obtained from the second horizontal transfer portion.

According to the second aspect of the present embodiment, the photoelectric conversion elements provided with the first filters having a first transmittance and the photoelectric conversion elements provided with the second filters having a second transmittance exist. The first signal charge and the second signal charge accumulated in the respective photoelectric conversion elements provided with the first and second filters are respectively transferred to the first and second horizontal transfer portions through the vertical transfer portions. The first signal charge is obtained from the first horizontal transfer portion, and the second signal charge is obtained from the second horizontal transfer portion.

According to the first and second aspects of the present embodiment, in the solid-state electronic imaging devices, a video signal constituted by the first signal charge is obtained from the first horizontal transfer portion, and a video signal constituted by the second signal charge formed under the exposure the amount of which is different from the amount of exposure forming the first signal charge is obtained from the second horizontal transfer portion. Even if exposure is not made twice, two video signals generated under the conditions of different amounts of exposure are obtained from the solid-state electronic imaging device, thereby to make it possible to cope with imaging of a subject including portions which largely differ in luminance by synthesizing the video signals.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a block diagram showing another embodiment of inlaying processing;

DESCRIPTION OF THE PREFERRED EMBODIMENTS

Referring now to FIGS. 1 to 4a, description is made of the basic concept of image inlaying synthesis processing according to the embodiment of the present invention.

Figure 1:
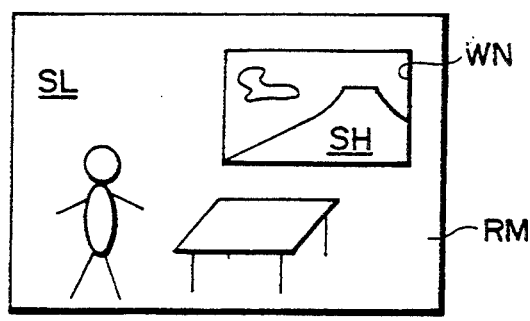
FIG. 1 illustrates a scene in a visual field of a camera.

FIG. 1 illustrates one example of a scene contained in a visual field of a camera at the time of imaging in a room with a window.

An image SL (this sign SL is also used for representing a part or area of the image) in a room RM is relatively dark. A scene of the outdoors is viewed through a window WN. An image SH (this sign SH is also used for representing a part or area of the image) of the scene is relatively bright. In general, the average luminance of the image SH viewed through the window WN is approximately five to ten times the average luminance of the image SL in the room RM. The dynamic range of an image sensor such as an image pick-up tube or a CCD can only correspond to a scene in which the average luminance of a relatively bright portion is approximately two to three times the average luminance of a relatively dark portion. More specifically, when the luminance of the relatively bright portion is not less than two to three times the luminance of the relatively dark portion, the sensor is saturated with respect to the bright portion when the dark portion is properly exposed (the bright portion appears white at the time of reproduction), while an image with respect to the dark portion is hardly picked up and the percentage of a noise component in a video signal is significantly increased when the bright portion is properly exposed.

Figure 2:
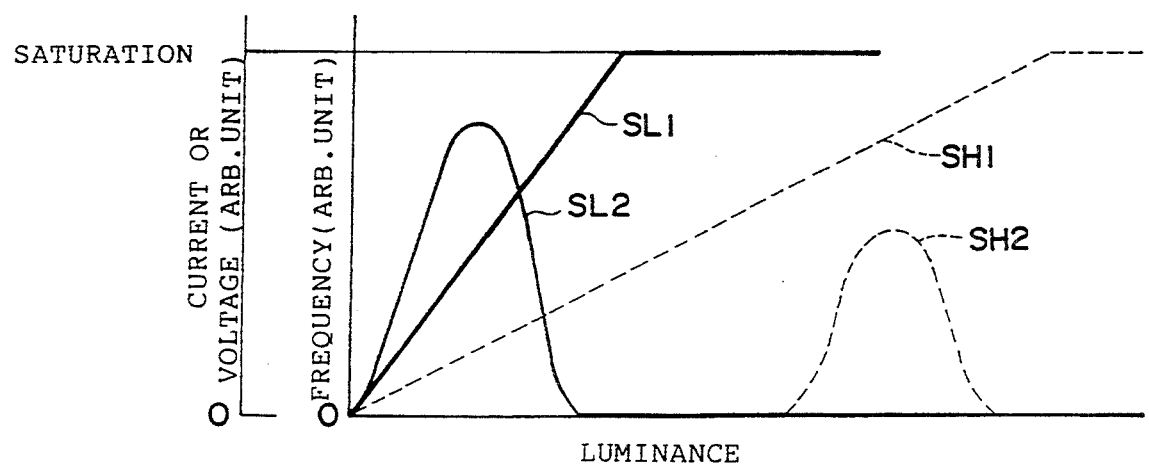
FIG. 2 shows the photoelectric conversion characteristics and the luminance of an image sensor.

FIG. 2 shows the photoelectric conversion characteristics and the luminance of an image sensor.

A solid line SL1 represents the photoelectric conversion characteristics of the image sensor in a case where the relatively dark image SL is properly exposed, and a solid line SL2 represents the frequency distribution of the luminance of the relatively dark image SL picked up under the photoelectric conversion characteristics SL1.

On the other hand, a broken line SH1 represents the photoelectric conversion characteristics of the image sensor in a case where the relatively bright image SH is properly exposed, and a broken line SH2 represents the frequency distribution of the luminance of the relatively bright image SH picked up under the photoelectric conversion characteristics SH1.

As can be seen from FIG. 2, the relatively bright image SH is completely contained in a saturated area of the photoelectric conversion characteristics SL1, and an output signal representing the relatively dark image SL is concentrated in a very low level under the photoelectric conversion characteristics SH1.

Figure 3A:
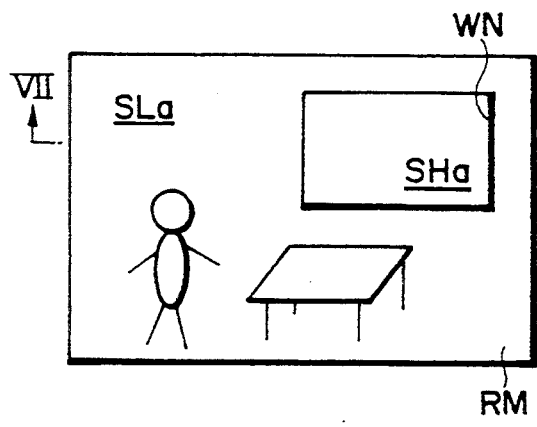
FIG. 3a illustrates an image picked up under the conditions of a relatively large amount of exposure.

FIG. 3a illustrates an image picked up under a proper exposure (which is relatively large) with respect to the brightness of a room RM. An image SLa in the room RM becomes a good image because it is properly exposed. On the other hand, an image SHa of a scene appearing through a window WN appears white.

Figure 3B:
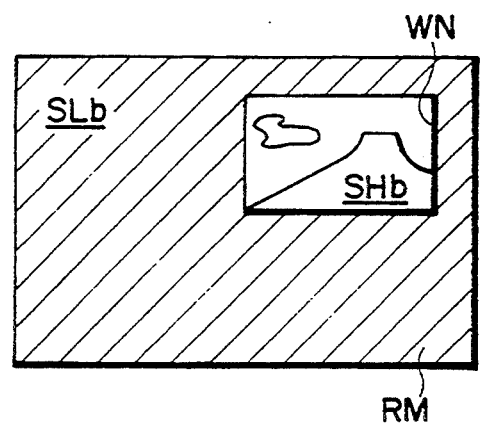
FIG. 3b illustrates an image picked up under the conditions of a small amount of exposure.

FIG. 3b shows an image picked up under a proper exposure (which is relatively small) with respect to an image SHb appearing through the window WN. The image SHb of a scene viewed through the window WN is good, while an image SLb in the room RM is significantly dark.

Figure 4:
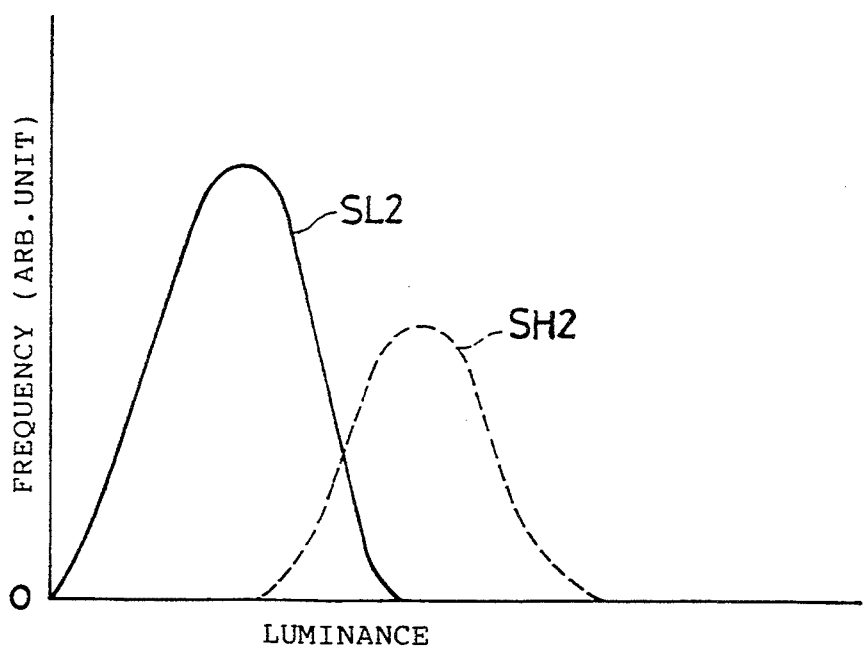
FIG. 4 shows a histogram showing the luminance of a composite image.

According to the present embodiment, an image of a saturated area in an image obtained under the conditions of a relatively large amount of exposure (the area need not be necessarily saturated, provided that it is relatively brighter than the other areas) is replaced with an image of a corresponding area in an image obtained under the conditions of a relatively small amount of exposure, to obtain an inlaid composite image. More specifically, the image SHa through the window WN shown in FIG. 3a is replaced with the image SHb through the window WN shown in FIG. 3b. Consequently, as shown in FIG. 1, both the image in the room RM and the image through the window WN become good images, thereby an image close to a scene as seen with the eyes of a person is obtained. A histogram of an image obtained by thus inlaying the images by synthesis is shown in FIG. 4. Two luminance distributions SL2 and SH2 are significantly close to each other.

An image of a relatively dark area in the image obtained under the conditions of a relatively small amount of exposure may be replaced with an image of a corresponding area in the image obtained under the conditions of a relatively large amount of exposure. For example, the image SLb in the room RM shown in FIG. 3b is replaced with the image SLa in the room RM shown in FIG. 3a.

Figure 5:
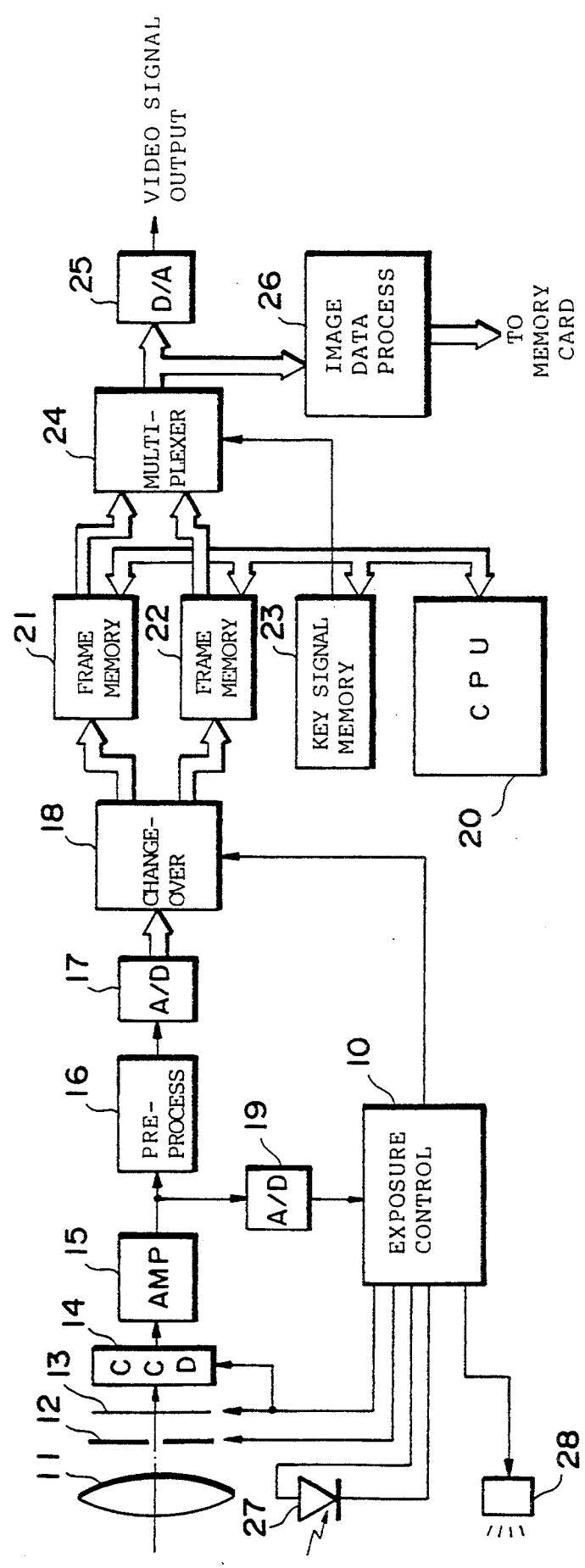
FIG. 5 is a block diagram showing an embodiment in which the present invention is applied to a still video camera.

FIG. 5 shows the construction of a still video camera (electronic still camera) according to an embodiment of the present embodiment.

An imaging optical system includes an imaging lens 11, a diaphragm 12, a shutter 13, and a CCD 14 serving as a solid-state electronic imaging device (image sensor). An exposure control circuit 10 includes a CPU (central processing unit). The exposure control circuit 10 controls the diaphragm 12, the shutter 13, and clearing of charge, reading of signals and the like in the CCD 14.

In the present embodiment, preliminarily imaging (preliminary exposure) and first and second formal imaging (formal exposure) are performed.

The preliminary imaging is for determining respective proper amounts of exposure in the first and second formal imaging. The exposure control circuit 10 determines the amount of exposure (f-stop value and shutter speed) for the preliminary imaging on the basis of the level of an output signal of a photometry sensor 27. As shown in FIG. 1, a subject to be imaged includes a dark portion and a bright portion. The output signal of the photometry sensor 27 indicates the average luminance of such a subject. The operations of the diaphragm 12 and the shutter 13 are respectively controlled by the f-stop value and the shutter speed for the preliminary imaging determined on the basis of the average luminance of the subject. A video signal outputted from the CCD 14 by the preliminary imaging is amplified by a pre-amplifier 15, and is further converted into digital image data by an A/D converter 19. The digital image data is applied to the exposure control circuit 10.

The exposure control circuit 10 determines the amounts of exposure for the first and second formal imaging on the basis of the digital image data representing an image of the subject obtained by the preliminary imaging. The subject has a dark portion and a bright portion, as described above. One of the first formal imaging and the second formal imaging and the other formal imaging are respectively performed under suitable amounts of exposure for the dark portion and the bright portion.

Figure 6:
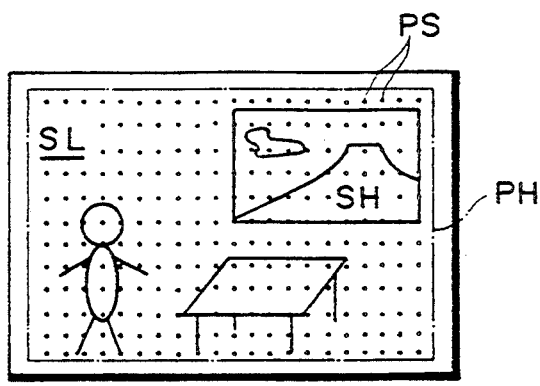
FIG. 6 illustrates sample points of image data.

In FIG. 6, an area represented by a one-dot and dash line PH is the photometric range of the photometry sensor 27. It is assumed that the photometry sensor 27 is not saturated even with respect to the bright portion of the subject. A lot of sample points PS are imaginarily set in the photometric range PH of the photometry sensor 27. When data at each of the sample points is represented by $S_i (i=1$ to $n)$, an output of the photometry sensor 25 is given by the following expression:

$$\sum_{i=1}^{n} S_i/n \quad (1)$$

The subject includes a dark portion (area) SL and a bright portion (area) SH. It is considered that a part representing the dark area SL of a video signal representing the image of the subject obtained in the preliminary imaging is not saturated, while a part representing the bright area SH of the video signal is saturated. The image data obtained by the preliminary imaging is sampled at the same sample points PS as described above.

The sampled data is represented by $S_j (j=1$ to $n)$. Let $m$ be the number of sampled data included in the dark portion SL in the image of the subject, and let $h$ be the number of sampled data included in the bright portion SH $(n=m+H)$.

If the sampled data $S_i$ obtained from the output signal of the photometry sensor 25 is used, the following expression holds:

$$\sum_{i=1}^{n} S_i/n = \left( \sum_{i=1}^{m} S_i + \sum_{i=1}^{h} S_i \right)/n \quad (2)$$

The sampled data $S_j$ of the image data obtained by the preliminary imaging is substituted for the first term in the numerator on the right-hand side of the expression (2), the expression (2) is as follows:

$$\sum_{i=1}^{n} S_i/n = \left( \sum_{j=1}^{m} S_j/n \right) + \left( \sum_{i=1}^{h} S_i/n \right) \quad (3)$$

The first term and the second term on the right-hand side of the expression (3) are respectively the expressions (4) and (5):

$$\sum_{j=1}^{m} S_j/n \quad (4)$$

$$\sum_{i=1}^{n} S_i/n \quad (5)$$

The value given by the expression (4) can be calculated using the image data obtained by the preliminary imaging. More specifically, this image data is sampled at the sample points PS, and sampled data $S_j$ obtained are compared with a suitable threshold value TH. The average value of the sampled data $S_j$ each having a value of less than the threshold value TH is the value given by the expression (4). The threshold value TH is set to a value slightly lower than the saturation level. Sampled data belonging to the bright area SH reach the saturation level. Accordingly, the sampled data belonging to the bright area SH are eliminated by comparison processing of the sampled data with the threshold value TH, to obtain the average value of sampled data belonging to the dark area SL. The amount of exposure (f-stop value and shutter speed) for the formal imaging for the relatively dark area SL is determined on the basis of the value given by the expression (4) thus calculated.

The video signal representing the image SH of the relatively bright area need not be necessarily saturated, unlike the foregoing. Also in this case, the threshold value TH is suitably determined, thereby to make it possible to discriminate between image data representing the bright area SH and image data representing the dark area SL.

The value on the left-hand side of the expression (3) (that is, the value given by the expression (1)) is known because it is represented by the level of the output signal of the photometry sensor 27. The value of the first term on the right-hand side of the expression (3) (that is, the value given by the expression (4)) is calculated in the above described manner. Consequently, the value of the second term on the right-hand side of the expression (3) (that is, the value given by the expression (5)) is easily found. Since the value given by the expression (5) represents the average luminance for the relatively bright area SH, the amount of exposure (f-stop value and shutter speed) for the formal imaging for the relatively bright area SH is determined on the basis of this value.

The sampled data $S_i$ based on the output signal of the photometry sensor 27 and the sampled data $S_j$ based on the output signal of the CCD 14 do not necessarily take an equal value. Consequently, the above described operation will be generally executed, taking $S_i = \alpha S_j (\alpha$ is a suitable constant).

If the photometric area of the photometry sensor 27 is divided into a plurality of small areas and the average luminance is found for each small area, the above described preliminary imaging is not necessarily required. More specifically, the average luminances for the respective small areas are compared with a suitable threshold value, and the average luminances are classified into the average luminances for the relatively dark portion of the image of the subject and the average luminances for the relatively bright area thereof in accordance with the results of the comparison. The amount of exposure for the relatively dark portion and the amount of exposure for the relatively bright portion are respectively determined on the basis of the average value of the average luminances for the relatively dark portion and the average value of the average luminances for the relatively bright portion. In general, the relatively dark portion and the relatively bright portion of the image of the subject do not necessarily correspond closely to the photometric small areas of the photometry sensor. Since there is a significant difference in luminance between the dark portion and the bright portion, however, it is possible to discriminate between photometric luminance data representing the photometric small areas almost corresponding to the relatively dark portion and photometric luminance data representing the photometric small areas almost corresponding to the relatively bright portion using a suitable threshold value.

Examples of a method of determining the f-stop value and the shutter speed include various methods such as a method of giving priority to the f-stop value and a method of giving priority to the shutter speed. However, the f-stop value and the shutter speed may be determined in any method, provided that at least the ability and the accuracy of the diaphragm 12 and the ability and the accuracy of the shutter 13, and the like are considered. In addition, when the electronic shutter function using the CCD 14 is utilized as described later, the allowable exposure time (for example, within IV = 1/60 seconds; V is a vertical scanning period) and the like will be also considered.

In any case, when a proper amount of exposure (a first amount of exposure) for the relatively dark portion SL of the image of the subject and a proper amount of exposure (a second amount of exposure which is smaller than the first amount of exposure) for the relatively bright portion SH thereof are determined in the above described manner, the diaphragm 12 and the shutter 13 are first controlled using the first amount of exposure, to perform the first formal imaging. A video signal outputted from the CCD 14 by the first formal imaging is amplified by the amplifier 15 and then, is subjected to preprocessing such as a gamma correction and the like in a preprocessing circuit 16, and is further converted into digital image data by an A/D converter 17. The digital image data is stored once in a first frame memory 21 through a selecting switch 18. Subsequently, the diaphragm 12 and the shutter 13 are controlled using the second amount of exposure, to perform the second formal imaging. A video signal outputted from the CCD 14 by the second formal imaging is also amplified, subjected to preprocessing, and converted into digital image data in the same manner. The digital image data is stored in a second frame memory 22 through the selecting switch 18. The switching of the selecting switch 18 is controlled by the exposure control circuit 10. It goes without saying that the formal imaging based on the second amount of exposure may be performed prior to the formal imaging based on the first amount of exposure.

The control of the shutter speed in the formal imaging may be realized by the electronic shutter function using the CCD 14. An electronic shutter is one whose exposure is started by clearing of unnecessary charge in the CCD 14, while being terminated by reading of a signal charge accumulated in the CCD 14, as is well-known. In this case, if the f-stop value is so determined that the maximum value of the exposure time (the time elapsed from the clearing of unnecessary charge until the signal charge is read out) is within 1/60 seconds = 1 V, the first formal imaging and the second formal imaging are terminated within 2/60 seconds = 2 V. If the electronic shutter function is utilized, two image data generated under the conditions of different amounts of exposure are obtained in a shorter time, as compared with a case where the exposure time is controlled using a mechanical shutter 13.

In order to perform the above described inlaying synthesis processing using the two image data thus obtained, a key signal memory 23 for storing a key signal, a CPU 20, and a multiplexer 24 are provided in addition to the two frame memories 21 and 22.

The CPU 20 compares image data for each pixel stored in the first frame memory 21 with a predetermined threshold value TH (which may be a value equal to or different from the threshold value for discriminating the level of the image data obtained by the above described preliminary imaging, provided that it is a value at which the relatively bright or saturated area can be distinguished from the other area), to write data 1 (one bit) as a key signal in the same position on the key signal memory 23 as the position of a pixel of image data having a value of not less than the threshold value as one belonging to the relatively bright area SH, while writing zero as a key signal in the same position on the key signal memory 23 as the position of a pixel of image data having a value of less than the threshold value as one belonging to the relatively dark area SL. The key signal memory 23 has a capacity capable of storing a key signal (one bit per one pixel) for one frame (or one field).

In such a manner, key signal data indicating whether each of the image data stored in the frame memories 21 and 22 is one related to the pixel belonging to the relatively dark area SL of the image of the subject (key signal data = 0) or one related to the pixel belonging to the relatively bright area SH thereof (key signal data = 1) is written in the key signal memory 23.

The multiplexer 24 is controlled by the key signal data set in the key signal memory 23. The multiplexer 24 respectively selects and outputs the image data read out from the frame memory 21 when the key signal data is zero and the image data read out from the frame memory 22 when the key signal data is one.

When the setting of the key signal data in the key signal memory 23 is terminated, the image data in the frame memories 21 and 22 as well as the key signal data in the key signal memory 23 are synchronously read out (that is, data related to the same pixel are simultaneously read out), to be applied to the multiplexer 24. The multiplexer 24 selectively outputs either one of the image data read out from the frame memories 21 and 22 in response to the key signal data, as described above. The image data outputted from the multiplexer 24 represents an inlaid composite image obtained by replacing image data representing a saturated (relatively bright) area in an image obtained under the conditions of a large amount of exposure with image data representing a corresponding area in an image obtained under the conditions of a small amount of exposure.

The image data outputted from the multiplexer 24 is converted into an analogue video signal by a D/A converter 25, to be outputted. If the analogue video signal is applied to a display device such as a CRT (cathode-ray tube), the inlaid composite image is displayed. The video signal can be also recorded on a magnetic recording medium such as a floppy disk, a magnetic tape or the like after being frequency-modulated. Alternatively, the image data outputted from the multiplexer 24 may be recorded on a memory card (containing a semiconductor memory, which is also referred to as a memory cartridge or the like) after being separated into luminance data and chrominance data (Y/C separated), data compressed, and coded by an image data processing circuit 26. However, inlaying synthesis processing of the above described image data need not be performed within a still video camera. In this case, the image data in the frame memories 21 and 22 are separately processed and then, are stored in separate areas in the memory card. The inlaying synthesis processing of the image data will be performed by an image processing apparatus separately provided.

A key signal may be generated using the image data obtained under the conditions of a small amount of exposure which is stored in the frame memory 22. In this case, a value which is so small as to be able to eliminate a relatively dark portion is adopted as a threshold value. 1 and 0 are respectively set in the key signal memory 23 in a case where the image data is not less than the threshold value and in the other case. In such a manner, image data representing a composite image obtained by replacing the image data representing the relatively dark area in the image obtained under the conditions of a small amount of exposure with image data representing a corresponding area in the image obtained under the conditions of a large amount of exposure is outputted from the multiplexer 24.

The still video camera shown in FIG. 5 includes a strobe device 28. The utilization of strobe flashing in the strobe device 28 makes it possible to obtain image data suitable for inlaying synthesis even if a clear distinction between a bright portion and a dark portion in an object to be picked up is not made.

For example, it is assumed that two objects which are approximately the same or are slightly different from each other in luminance are in positions relatively nearer and farther away from the camera. If the amount of strobe light is so adjusted that the object in the position nearer the camera is properly exposed, the object in the position farther away from the camera is not sufficiently exposed. On the other hand, if the amount of strobe light is so adjusted that the object in the position farther away from the camera is properly exposed, a video signal obtained is saturated with respect to the object in the position nearer the camera.

According to the present embodiment, the first imaging is performed using such an amount of strobe light that the object in the position relatively farther away from the camera is properly exposed, and the second imaging is performed using such an amount of strobe light that the object in the position relatively nearer the camera is properly exposed. In such a manner, two image data are obtained. The image data are inlaid by synthesis in exactly the same manner as described above.

It goes without saying that if the difference in luminance between the objects in the positions farther away from and nearer to the camera is large, the amount of strobe light is adjusted in consideration of this difference in luminance. In any case, the amount of strobe light may be so controlled that the difference in average luminance between the two image data obtained is relatively small (the average luminance of one of the image data is within two to three times that of the other image data).

Examples of a method of discriminating between the relatively bright area SH and the relatively dark area SL in the image of the subject include various methods in addition to the above described processing of merely comparing the image data with the threshold value TH. A description is now made of the other discriminating methods. Only a method of extracting a relatively bright area in an image obtained under the conditions of a large amount of exposure will be described herein because it is also possible to extract a relatively dark area in an image obtained under the conditions of a small amount of exposure in exactly the same method.

For simplification, consider a video signal along a horizontal scanning line represented by a line VII—VII in FIG. 3a.

Figure 7A:
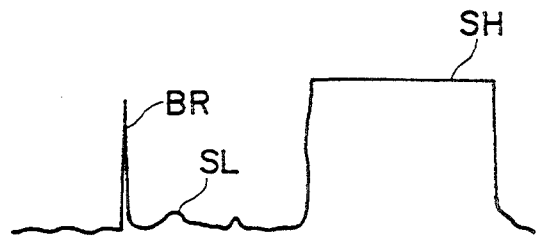
FIG. 7a is a waveform diagram showing one example of a video signal.

FIG. 7a shows one example of the above described video signal along the horizontal scanning line. A video signal representing a relatively bright area SH is saturated. In a relatively dark area SL, there is a small bright point (for example, a part of a glass piece, a metal or the like shines by the reflection of light). It is assumed that a sharp pulse-shaped waveform BR appears in the video signal due to this bright point.

If such a video signal passes through a low-pass filter (hereinafter referred to as LPF), the sharp pulse-shaped waveform becomes smooth and low in height, as indicated by a sign br in FIG. 7b. If a distinction between the levels of this video signal is made using a threshold value TH set to a higher level than a peak value of the waveform br, only the bright area SH is extracted. In such a manner, the small bright point which partially exists in the dark area SL is ignored, to previously prevent inlaying synthesis processing from being performed for such a small area.

The relatively bright area need not be necessarily saturated, unlike the foregoing. It will be easily understood from FIG. 7b that the bright area which is not saturated can be extracted by suitably setting the threshold level TH (it may be considered that a peak value in the bright portion SH is lower than the saturation level ).

The filtering technique of digital data has been well-known. The above described discussion also applies to processing in the CPU 20 of discriminating between the area SH and the area SL by processing the digital image data stored in the frame memory 21 (or 22) in the still video camera shown in FIG. 5. The CPU 20 executes low-pass filtering processing on the digital image data, and compares the filtered image data with data representing a threshold value.

Figure 8A:
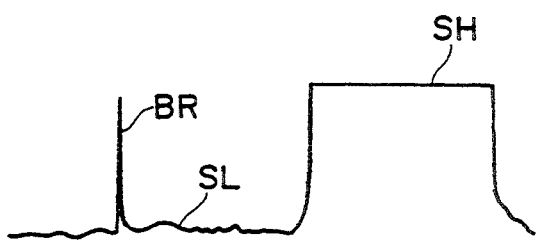
FIGS. 8a, 8b and 8c are waveform diagrams showing processing of detecting a bright area having a width of not less than a predetermined width.
Figure 8B:
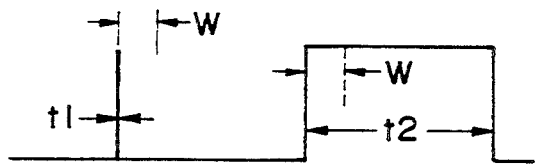
Figure 8C:
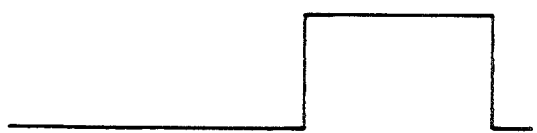

FIGS. 8a, 8b, and 8c show another discriminating method. FIG. 8a illustrates the same video signal as that shown in FIG. 7a. A front edge (leading edge) which abruptly rises and a rear edge (trailing edge) which abruptly falls are detected in this video signal. The width (or time) t1 or t2 from the front edge to the rear edge is measured. The width t1 or t2 is compared with a suitable reference width W (see FIG. 8b). It is judged that only a portion having a larger width than the reference width W is a relatively bright area (see FIG. 8c). Also by this method, a small bright point which exists in a relatively dark area can be excluded from an object of inlaying synthesis.

It goes without saying that this method can be carried out in both an analog manner and a digital manner. When the method is carried out in an analog manner, it is possible to use a monostable multivibrator having a stable time corresponding to the reference width W. This monostable multivibrator is triggered (set) by the front edge of the video signal, and is reset by the rear edge. If the monostable multivibrator generates an output in a portion before being reset after having been set (if the time corresponding to the width W has elapsed after the monostable multivibrator was set), the portion is judged to be a bright area. It may be judged in a digital manner whether or not the length from the front edge to the rear edge is larger than the width W.

Figure 7B:
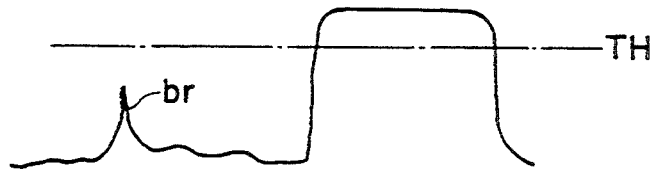
FIG. 7b is a waveform diagram showing a video signal after passing through an LPF.

In the method shown in FIGS. 7a and 7b, the boundary between the bright area and the dark area may be slightly shifted due to a phase lag inevitably occurring in filtering. On the other hand, in the method shown in FIGS. 8a, 8b, and 8c, the boundary between the bright area and the dark area is not shifted, thereby making it possible to achieve an accurate judgement.

Although a description was made of the detection of the boundary between the areas appearing in the video signal along the horizontal scanning line (the boundary extending in the vertical scanning direction of the image), the same method as described above can be employed for the detection of the boundary extending in the horizontal direction of the image. Particularly when digital image data is processed in a digital manner, the filtering and the detection of the width in the vertical direction are easy. In addition, the method shown in FIG. 8 is carried out in a two-dimensional manner, thereby to make it possible to exclude a bright point having an area of not more than a predetermined area from an object of inlaying synthesis and perform inlaying synthesis processing only for a bright area having an area in excess of a predetermined area.

Figure 9:
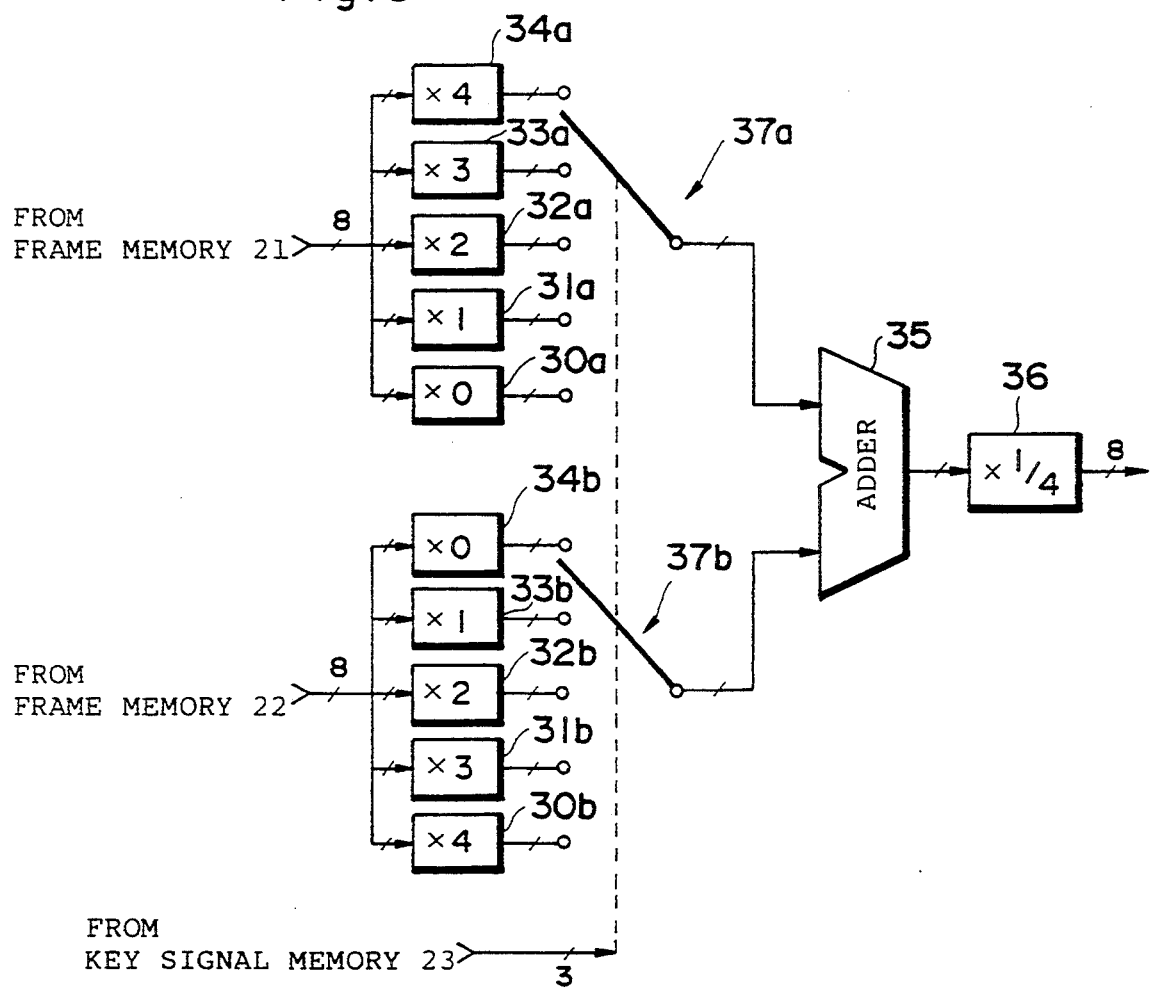
FIG. 9 is a block diagram showing an example of circuitry for obtaining the weighted average of image data in the boundary between a bright area and a dark area.

FIG. 9 shows another example of inlaying synthesis processing, and particularly shows the circuit arrangement which realizes a method of making the vicinity of the boundary between two areas to be inlaid smoothly continuous. The circuitry shown in FIG. 9 is replaced with the multiplexer 24 shown in FIG. 5.

The image data (for example, 8 bits) read out from the frame memory 21 is multiplied by 0, 1, 2, 3 and 4 respectively by multipliers 30a, 31a, 32a, 33a and 34a, to be applied to a multiplexer (selecting switch) 37a. The image data read out from the frame memory 22 is multiplied by 4, 3, 2, 1 and 0 respectively by multipliers 30b, 31b, 32b, 33b and 34b, to be applied to a multiplexer 37b.

The multiplexers 37a and 37b are controlled by the key signal data (3-bit data in the present embodiment) applied from the key signal memory 23. When the multiplexer 37a selects the multipliers 30a, 31a, 32a, 33a or 34a, the multiplexer 37b selects the multipliers 30b, 31b, 32b, 33b or 34b.

Outputs of the multiplexers 37a and 37b are added to each other by an adder 35 and is further divided by 4 by a divider 36, to be outputted as composite image data (for example, 8 bits again).

The multiplexers 37a and 37b respectively select the multipliers 32a and 32b in one pixel on a boundary line detected between the relatively dark area SL and the relatively bright area SH. Consequently, the arithmetical mean of the image data in the frame memory 21 and the image data in the frame memory 22 become composite image data on the boundary line.

In one pixel adjacent to the boundary line on the side of the dark area SL as seen from the above described boundary line, the multiplexers 37a and 37b respectively select the multipliers 33a and 33b. Consequently, in this pixel, the average (weighted average) of three times the image data in the frame memory 21 and one times the image data in the frame memory 22 become composite image data.

In all pixels inside of the dark area SL as seen from the above described pixel adjacent to the boundary line, the multiplexers 37a and 37b respectively select the multipliers 34a and 34b. Consequently, the image data in the frame memory 21 is outputted as composite image data.

In one pixel adjacent to the boundary line on the side of the bright area SH as seen from the boundary line, the multiplexers 37a and 37b respectively select the multipliers 31a and 31b. Consequently, in this pixel, the average (weighted average) of one times the image data in the frame memory 21 and three times the image data in the frame memory 22 become composite image data.

In all pixels inside of the bright area SH as seen from the above described pixel adjacent to the boundary line, the multiplexers 37a and 37b respectively select the multipliers 30a and 30b. Consequently, the image data in the frame memory 22 is outputted as composite image data.

The key signal data stored in the key signal memory 23 is generated as 3-bit data by the CPU 20 depending on whether or not a pixel is on the boundary line, adjacent thereto or spaced apart therefrom or which of the areas contains the pixel so as to control the multiplexers 37a and 37b as described above.

As described above, composite image data is generated by the weighted average of two types of image data to be inlaid (which is weighted depending on the position) in the vicinity of the boundary between the areas SL and SH. Accordingly, the image data are made smooth and continuous in the vicinity of the boundary. Consequently, the boundary between the two areas is given a natural impression when the composite image is reproduced, thereby to previously prevent each of the areas from having a pseudo-outline.

Although in the foregoing description, the weighing for the weighted average is changed for each pixel, it goes without saying that it may be changed for a plurality of pixels.

Figure 10:
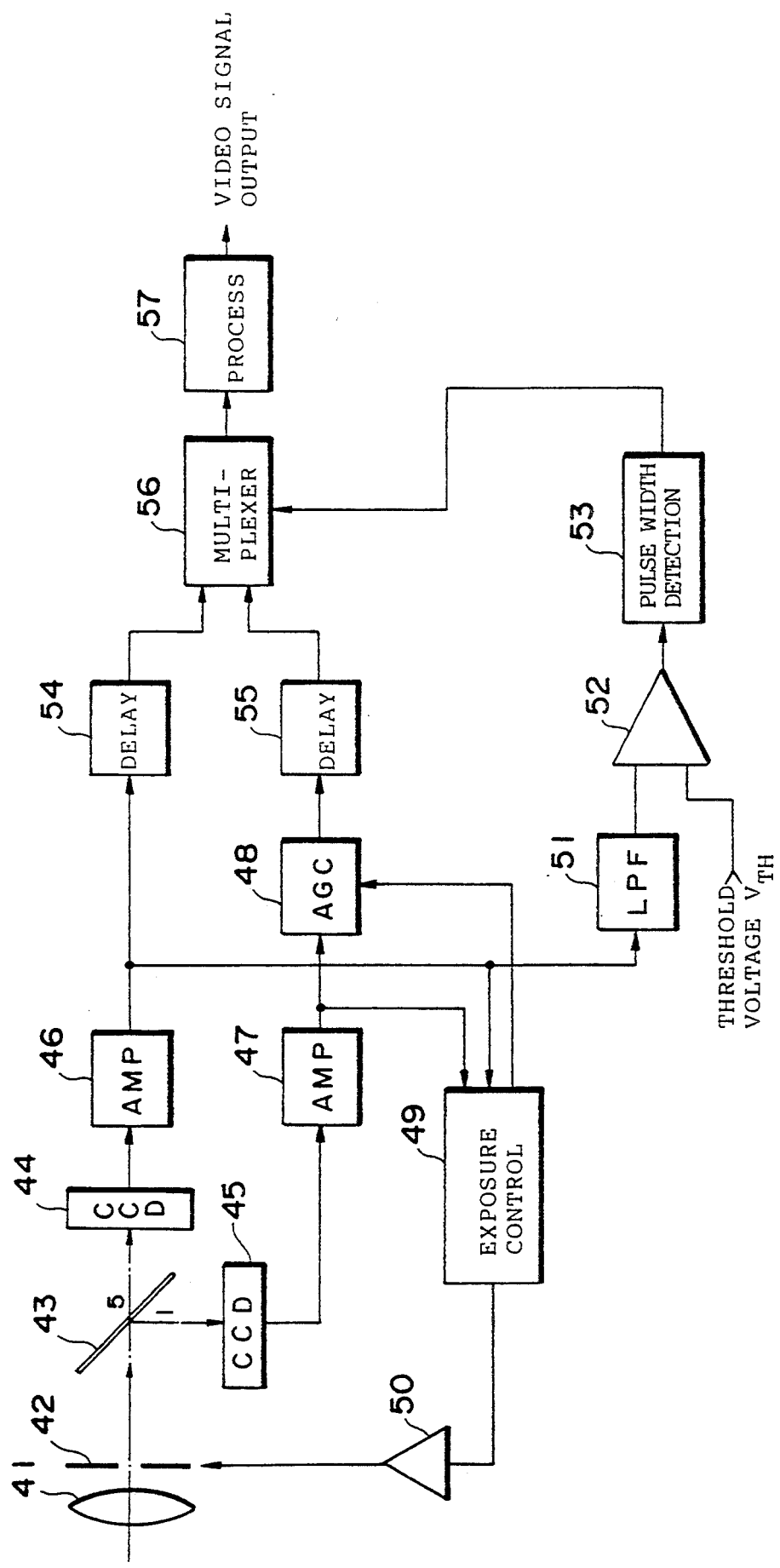
FIG. 10 is a block diagram showing an embodiment in which video signals are inlaid by synthesis in real time.

FIG. 10 shows an embodiment in which image inlaying synthesis processing is performed on an analog video signal in real time. The circuitry according to the present embodiment is applicable to not only a still video camera but also a movie video camera.

An imaging optical system includes an imaging lens 41, a diaphragm 42, a beam splitter 43, and two CCDs 44 and 45. A light image representing a subject is divided by the beam splitter 43 through the lens 41 and the diaphragm 42, and is formed on the two CCDs 44 and 45. As described above, in the case of, for example, imaging in a room with a window, the Patio of the average luminance of the relatively dark area SL to the average luminance of the relatively bright area SH is approximately 1:5 to 10. In the present embodiment, the division ratio of light by the beam splitter 43 is set to 5:1. Light whose amount is five-sixths the amount of incident light is incident on the CCD 44 through the beam splitter 43. Light whose amount is one-sixth the amount of the incident light is reflected by the beam splitter 43, to be incident on the CCD 45.

A video signal outputted from the CCD 44 is amplified by a pre-amplifier 46 and then, on one hand, is applied to a delay circuit 54 and on the other hand is inputted to an exposure control circuit 49. A video signal outputted from the CCD 45 is amplified by a pre-amplifier 47 and then, is applied to an automatic gain control amplifier circuit (hereinafter referred to as AGC) 48 and is also fed to the exposure control circuit 49. The exposure control circuit 49 controls the diaphragm 42 through a driver 50 and also adjusts the gain of the AGC 48.

An output video signal of the CCD 44 subjected to a large amount of exposure is employed for exposure control. The exposure control circuit 49 so adjusts the diaphragm 42 that the relatively dark area SL of the image of the subject is properly exposed on the basis of the level of the video signal applied from the amplifier 46. The shutter speed (exposure time) is fixed and is kept at, for example, 1/60 seconds (or 1/30 seconds). That is, no mechanical shutter is provided, so that the exposure time is defined by clearing of unnecessary charge and reading of signal charge in the CCDs 44 and 45.

In the present embodiment, the image of the subject is continuously picked up, and the video signal for one field (or one frame) is outputted from the CCDs 44 and 45 for each, for example, 1/60 seconds (or 1/30 seconds).

The amount of exposure is so adjusted that the relatively dark area SL of the image of the subject formed on the CCD 44 is properly exposed, and the division ratio by the beam splitter 43 is set to 5:1. Accordingly, it can be expected that the relatively bright area SH of the image of the subject formed on the CCD 45 is also properly exposed. The AGC 48 is provided so that the image of the relatively dark area SL and the image of the relatively bright area SH are properly matched when they are synthesized (for example, so as to prevent such a situation that the image of the relatively bright area SH becomes darker than the image of the relatively dark area SL in an image after the synthesis). The exposure control circuit 49 detects the peak level of a video signal for the previous field (or previous frame) applied from the amplifier 47 and adjusts the gain of the AGC 48 so that the peak level is kept constant in a video signal for the subsequent field (or subsequent frame). In such a manner, the gain of the AGC 48 is adjusted for each one field or one frame (for each 1/60 seconds or 1/30 seconds), so that the brightness in a brightest part of the image of the relatively bright area SH is always kept approximately constant.

An output of the amplifier 46 which is a video signal generated under the conditions of a large amount of exposure also passes through an LPF (low-pass filter) 51, so that only its low frequency component is applied to a comparator 52. A threshold voltage $V_{TH}$ is set in the comparator 52. The comparator 52 generates an output when the level of an input video signal exceeds the threshold voltage VTH. An output of the comparator 52 is inputted to a pulse width detecting circuit 53. The pulse width detecting circuit 53 includes a monostable multivibrator and the like as described above, and delays, when the pulse width of an output signal of the comparator 52 exceeds a reference width W, the output signal by time corresponding to the above described reference width W to output the same. An output signal of the pulse width detecting circuit 53 is applied to a multiplexer 56 as its control signal.

A delay time equal to the above described time corresponding to the reference width W (or a time obtained by adding to this time delay time due to an operation of the LPF 51) is set in delay circuits 54 and 55. The output video signal of the amplifier 46 and an output video signal of the AGC 48 are delayed by the delay time set in the delay circuits 54 and 55, to be inputted to the multiplexer 56.

The multiplexer 56 usually selects an output video signal of the delay circuit 54 to output the same, while selecting an output video signal of the delay circuit 55 to output the same when the output signal is applied from the pulse width detecting circuit 53. Consequently, image inlaying synthesis processing based on the above described principle is performed. An output video signal of the multiplexer 56 is subjected to a Gamma correction or the like in a video signal processing circuit 57.

FIG. 11 shows another embodiment of inlaying synthesis processing. A description is now made of an image in which the background is very bright and a main subject (a person) in the center is relatively dark, as shown in FIG. 12a or FIG. 12b, by way of example.

Figure 12A:
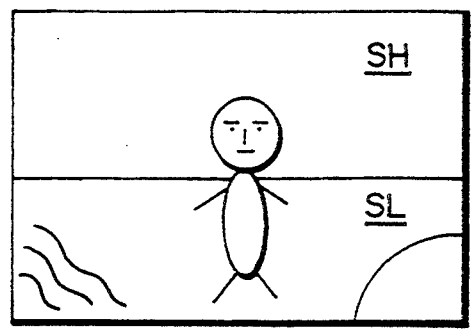
FIG. 12a illustrates an image picked up under the conditions of a large amount of exposure.
Figure 12B:
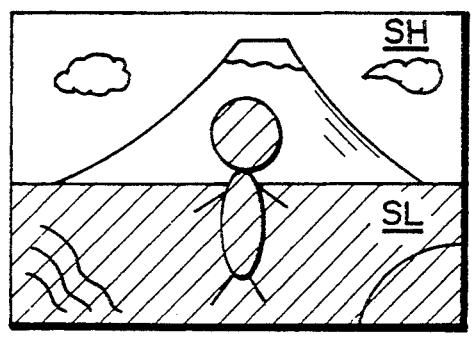
FIG. 12b illustrates an image picked up under the conditions of a small amount of exposure.

Data representing an image as shown in FIG. 12a which is picked up under the conditions of an amount of exposure (a relatively large amount of exposure) properly set for a relatively dark portion (a main subject) SL is stored in a frame memory 21 (this data is referred to as first image data). In the image shown in FIG. 12a, image data representing a relatively bright portion (the background) SH is saturated, so that the relatively bright portion SH appears white. Data representing an image as shown in FIG. 12b which is picked up under the conditions of an amount of exposure (a relatively small amount of exposure) properly set for a relatively bright portion SH is stored in the frame memory 22 (this data is referred to as second image data). In the image shown in FIG. 12b, the image of a relatively dark portion SL is dark throughout and hardly differs in luminance, so that the relatively dark portion SL appears black. These first and second image data can be obtained by making exposure twice as in the embodiment shown in FIG. 5 or by using two CCDs as in the embodiment shown in FIG. 10.

Figure 12C:
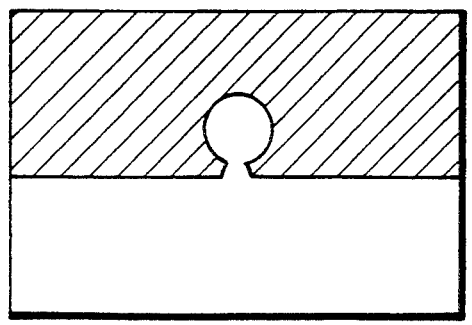
FIG. 12c illustrates a mask pattern.
Figure 12D:
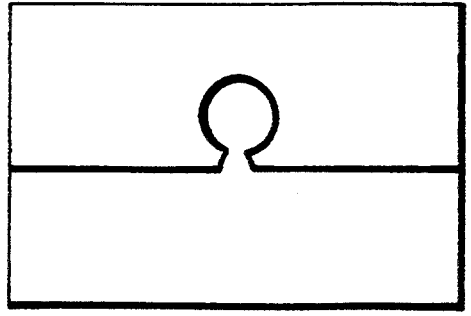
FIG. 12d illustrates an edge pattern.

A mask pattern and edge pattern generating potion 63 is for generating data representing a mask pattern and data representing an edge pattern on the basis of the first image data in the frame memory 21. The mask pattern is for masking the relatively bright area SH (indicated by hatching), as shown in FIG. 12c. The mask pattern data is composed of one bit per one pixel, its mask portion and the other portion being respectively expressed by, for example, data 1 and data 0. The mask pattern data is stored in a mask pattern memory 61. The edge pattern represents an edge of the mask pattern (the boundary between the relatively bright area SH and the relatively dark area SL), as shown in FIG. 12d, and has a width almost corresponding to two to three pixels. The edge pattern data is also composed of one bit per one pixel, its edge portion being expressed by data 1. The edge pattern data is stored in an edge pattern memory 62. The details of processing of generating the mask pattern data and the edge pattern data will be described later.

Figure 13A:
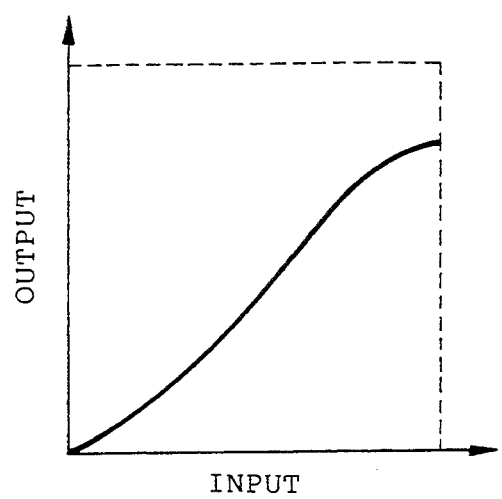
FIG. 13a is a graph showing the characteristics of an LUT for level compression.
Figure 13B:
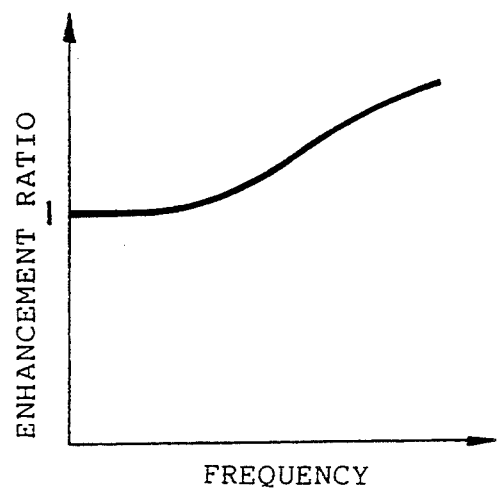
FIG. 13b is a graph showing the characteristics for enhancment processing.

The second image data in the frame memory 22 is applied to a nonlinear processing portion 64. This nonlinear processing portion 64 performs level compression processing, enhancement processing and level shift processing in the present embodiment. The level compression processing is for compressing the number of bits composing the second image data into the number of bits which can be reproduced (the number of bits may be increased by the enhancement processing and the level shift processing), that is, converting the number of bits using, for example, a look-up table (LUT) having nonlinearity as shown in FIG. 13a. The enhancement processing is for multiplying the image data by an enhancement ratio as shown in FIG. 13b, so that a high frequency component of the image is emphasized. The change in luminance of the image is smoothed by the above described level compression processing. However, an edge in the image is emphasized by the high frequency emphasis processing. The level shift processing is for making the image bright (or dark) throughout and is realized by equally adding (or subtracting) a predetermined value to (from) the image data. All of the level compression processing, the enhancement processing and the level shift processing need not be necessarily performed. That is, any one or two of them may be performed.

The first image data in the frame memory 21 and the second image data read out from the frame memory 22 and subjected to nonlinear processing in the processing portion 84 are applied to a multiplexer 65. The multiplexer 65 is controlled by the mask pattern data in the mask pattern memory 61. The first image data, the second image data and the mask pattern data are synchronously applied, that is, the data concerning the same pixel constituting the image are simultaneously applied to the multiplexer 65. The multiplexer 65 selects the first image data when the mask pattern data is 0, while selecting the second image data when the mask pattern data is 1, to output the same. Consequently, image data representing the relatively dark portion SL in the first image data and image data representing the relatively bright portion SH in the second image data are inlaid by synthesis.

The image data outputted from the multiplexer 65 is applied to a blending portion 66. The blending portion 66 is realized by a kind of LPF. The blending portion 66 subjects the input image data to low-pass filtering processing in the edge portion where the data applied from the edge pattern memory 62 is 1, to smooth the change in luminance in the edge portion. Consequently, when an inlaid composite image is reproduced, the boundary portion of the two areas SL and SH is given a natural impression.

The image data outputted from the blending portion 66 is then subjected to a gamma correction in a gamma correcting portion 67 and then, is outputted as composite image data.

A part of all of the foregoing processing can be performed using a hardware circuit, or can be also performed by software processing executed by a computer.

Figure 14:
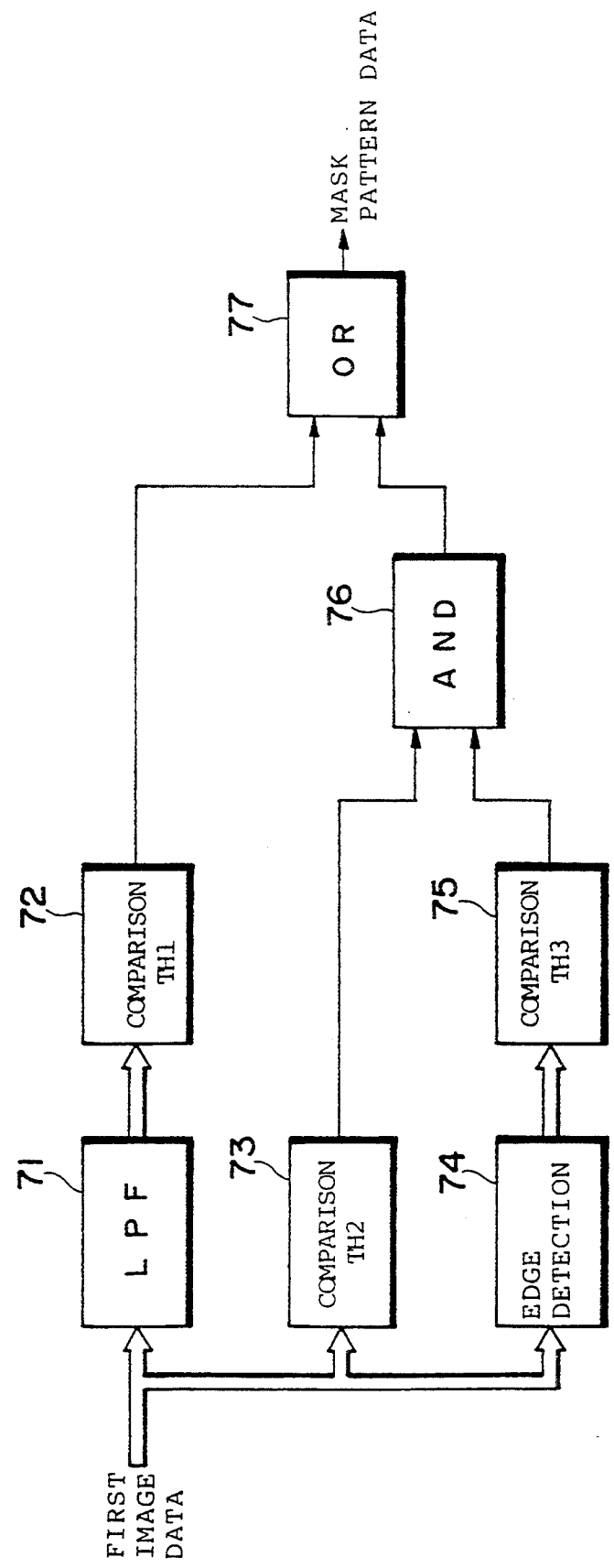
FIG. 14 is a block diagram showing circuitry for generating a mask pattern in an embodiment of the present invention.

FIG. 14 shows the procedure for processing of generating mask pattern data. The first image data is low-pass filtered by an LPF 71 and then, is compared with a first threshold level TH1 in a comparing portion 72. When the image data is larger than the first threshold level TH1, 1-bit data 1 is outputted from the comparing portion 72, to be mask pattern data through an OR gate 77. By this processing, mask pattern data 1 is set for the relatively bright portion SH.

A comparing portion 73, an edge detecting portion 74, a comparing portion 75, and an AND gate 76 are for extracting a high luminance point in an edge. The first image data is compared with a second threshold level TH2 higher than the first threshold level TH1 in the comparing portion 73. Data 1 is outputted from the comparing portion 73 when the first image data exceeds the second threshold level TH2. The first image data is also applied to the edge detecting portion 74, so that its differentiated value is operated. This differentiated value is applied to the comparing portion 75. The comparing portion 75 outputs data 1 when the differentiated value exceeds a third threshold value TH 3. Outputs of the comparing portions 73 and 75 are added to the mask pattern data in the OR gate 77 through the AND gate 76. In such a manner, the mask pattern data with respect to the high luminance point in the edge portion becomes 1. Consequently, inlaying synthesis processing in the edge portion can be performed elaborately.

Figure 15:
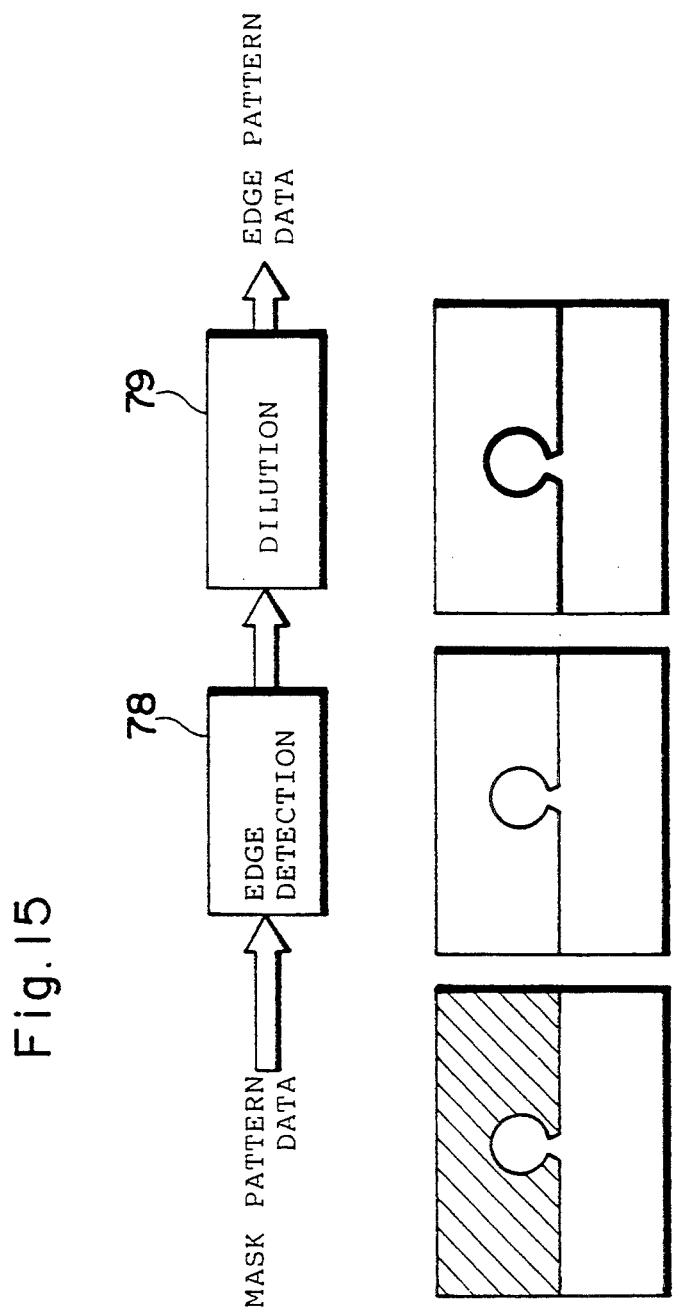
FIG. 15 is a block diagram showing circuitry for generating an edge pattern in an embodiment of the present invention.

FIG. 15 shows the procedure for processing of generating edge pattern data. The mask pattern data obtained in the above described manner is applied to an edge detecting portion 78, so that its edge is detected. Data representing the detected edge is applied to a dilution portion 79, with the edge being enlarged so as to have an edge width corresponding to two to three pixels. Data representing the edge whose width is thus increased becomes edge pattern data. In FIG. 15, a mask pattern and a pattern generated by processing in each of the edge detecting portion 78 and the dilution portion 79 are drawn in corresponding positions.

In FIG. 14 and FIG. 15, it goes without saying that the mask pattern generation and edge pattern generation processing can be realized by a dedicated hardware circuit, or can be also performed by digital processing using a computer.

Figure 16:
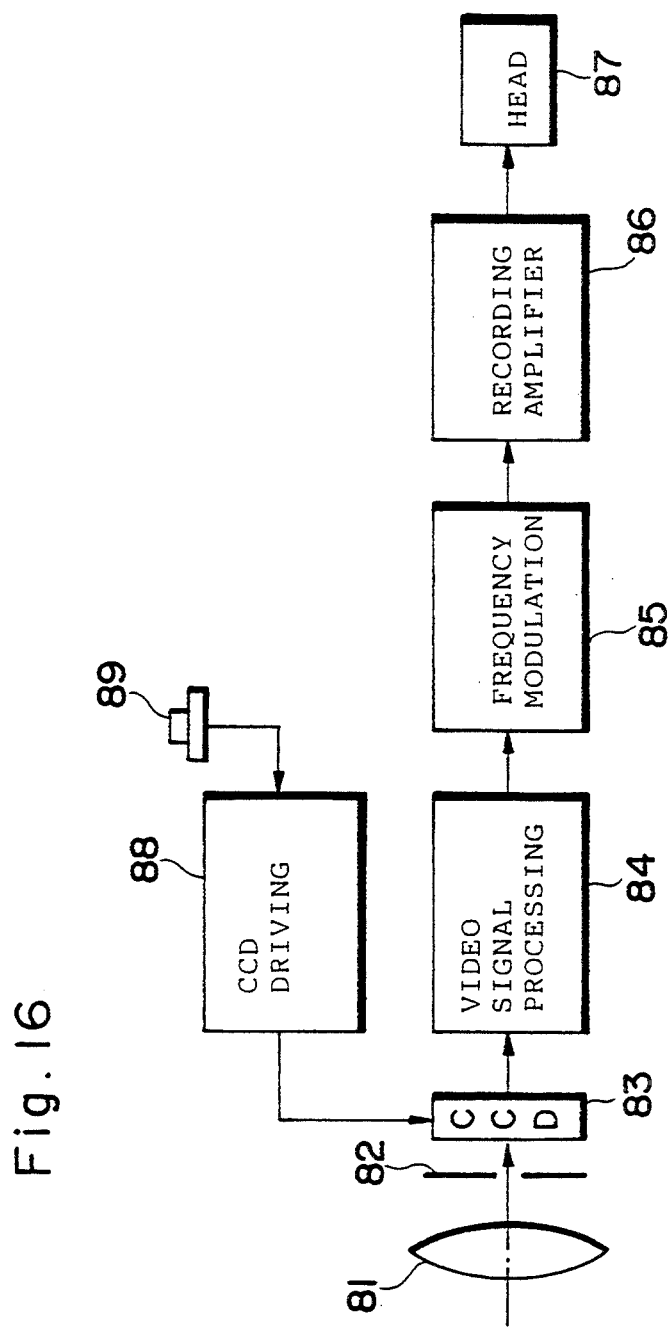
FIG. 16 is a block diagram showing an embodiment in which the present invention is applied to a movie/still video camera.

An embodiment shown in FIG. 16 relates to a movie/still video camera.

Figure 17:
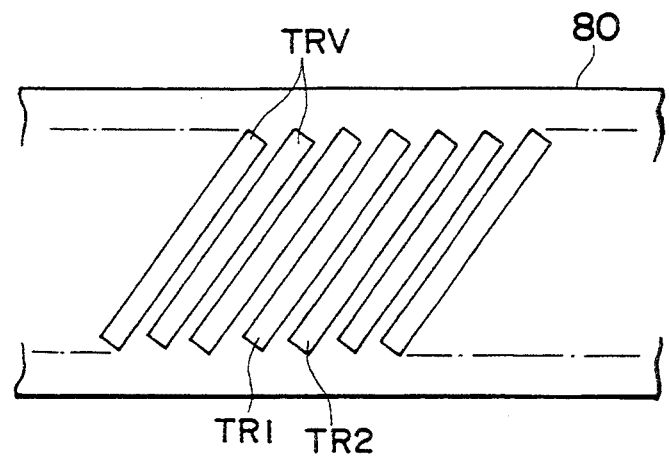
FIG. 17 illustrates a video track of a magnetic tape.

The movie/still video camera is usually operated in a movie mode. More specifically, an image of a subject formed on a CCD 83 through an imaging lens 81 and a diaphragm 82 is converted into a video signal representing the image by the CCD 83, to be outputted. This video signal is subjected to processing such as automatic gain control amplification, white balance adjustment, a gamma correction and the like in a video signal processing circuit 84, and is further frequency-modulated in a frequency modulating circuit 85. A frequency-modulated video signal is applied to a magnetic head 87 through a recording amplifier 86, to be magnetically recorded on a video track TRV of a magnetic tape 80 for each field, as shown in FIG. 17.

The diaphragm 82 is normally so adjusted by an automatic exposure control circuit (not shown) that a main subject (a person or the like) in a visual field of the camera is properly exposed. The exposure time of the CCD 83 is controlled by a CCD driving circuit 88, to be kept constant (for example, 1/60 seconds). Consequently, if the average luminance of the background is much higher than the average luminance of the main subject, photodiodes in the CCD 83 are saturated with respect to an image of the background. When the video signal recorded on the video tape 80 is reproduced, the background appears white.

Even in such a situation, the movie/still video camera according to the present embodiment can record a video signal representing an image in which both a main subject and the background are suitably exposed.

When a user of the camera desires to reserve an image of a subject in a visual field as a still image, the user depresses a shutter release button 89. A shutter release signal from the shutter release button 89 is applied to a CCD driving circuit 88. When the shutter release signal is fed, the CCD driving circuit 88 so adjusts the timing of clearing unnecessary charge in the CCD 83 that the exposure time becomes one-fourth of the exposure time in the movie mode in a field subsequent to a field where exposure is made at that time when the shutter release signal is fed, (a video signal for this field shall be recorded on a video track TR1 of the magnetic tape 80). The f-stop value of the diaphragm 82 is not changed (the control by the automatic exposure control circuit continues to be carried out). The video signal obtained from the CCD 83 under the condition that exposure is thus made in a short time is recorded on a video track TR2 subsequent to the video track TR1. In the video signal on the video track TR2, the background is almost properly exposed, while a main subject appears black because it is not sufficiently exposed.

It goes without saying that the ratio of shortening of the exposure time is not limited to $\frac{1}{4}$. For example, it may be $\frac{1}{3}$, 1/5 and the like. In addition, as in the embodiment shown in FIG. 5, the exposure time can be so determined that the background is properly exposed on the basis of sampled data of the video signal for the preceding field (corresponding to the above described preliminary imaging) and photometric data.

The video signals for the two fields thus recorded on the magnetic tape 80 (the video signals recorded on the video tracks TR1 and TR2) are synthesized in accordance with the above described inlaying synthesis technique in a signal processing circuit provided for a reproducing device, to be applied to a display device or a printer as one representing one frame image.

Figure 18:
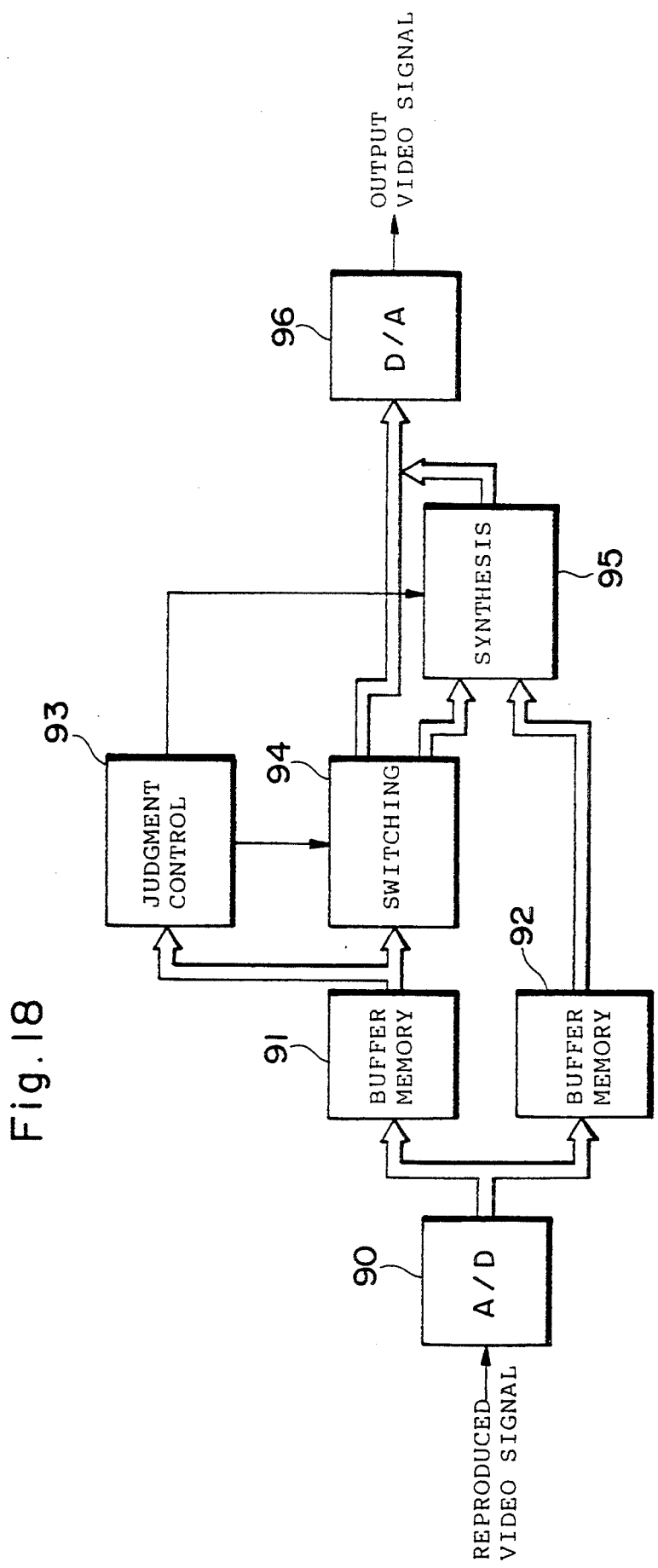
FIG. 18 is a block diagram showing one example of circuitry for synthesizing images in an embodiment of the present invention.

FIG. 18 shows circuitry provided for a reproducing device of a display device or a printer for performing inlaying synthesis processing in an embodiment of the present invention. The video signal reproduced from the video track TR1 of the magnetic tape 80 by the reproducing device is converted into digital image data by an A/D converter 90 and then, is stored in a buffer memory 91. Similarly, the video signal reproduced from the video track TR2 is converted into digital image data, to be stored in a buffer memory 92.

A judgment control circuit 93 judges whether or not the area of saturated image data in the image data stored in the buffer memory 91 is not less than a predetermined area. If there is no saturated image data or there is saturated image data whose area is very small, the image data in the buffer memory 91 is outputted directly through a switching circuit 94 or after being converted into an analog video signal by a D/A converter 96. This image data or video signal is used for displaying or printing out an image.

When the area of the saturated image data is not less than a predetermined area, the judgment control circuit 93 connects the buffer memory 91 to a synthesizing circuit 95. The image data are synchronously read out from both the buffer memories 91 and 92, to be applied to the synthesizing circuit 95. Areas to be inlaid by synthesis are designated by the judgment control circuit 93. In the synthesizing circuit 95, inlaying synthesis processing is performed in accordance with the inlaying synthesis technique as described in detail above. Image data obtained by the synthesis is outputted directly or after being converted into an analog video signal, to be used for displaying or printing out an image.

A person may see an image displayed using the image data in the buffer memory 91 to judge whether or not inlaying synthesis processing should be performed. In addition, video signals for two frames obtained under the conditions of different amounts of exposure can be recorded on the magnetic tape in place of recording video signals for two fields obtained under the conditions of different amounts of exposure on the magnetic tape. Furthermore, it goes without saying that the function of a part of the circuitry shown in FIG. 18 can be realized by processing by software.

Figure 19:
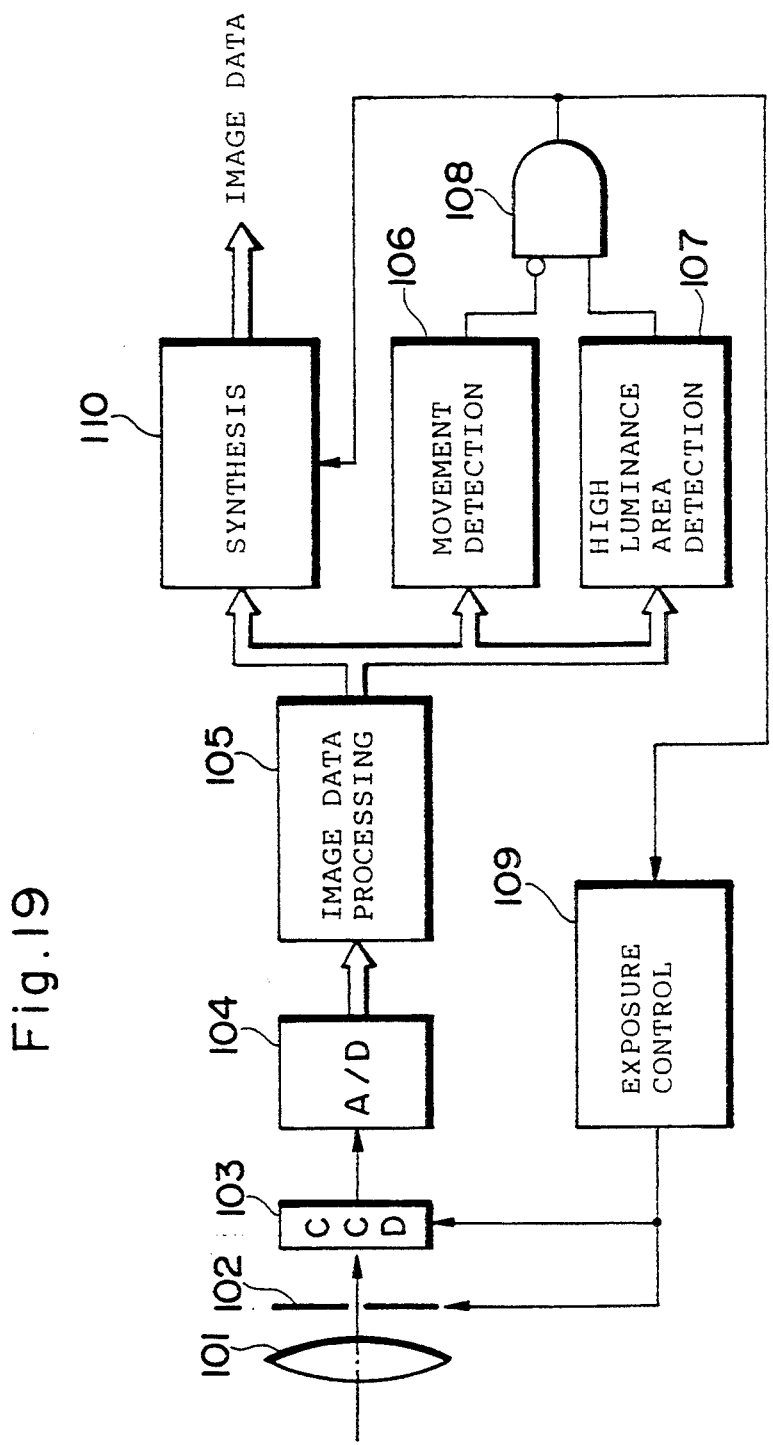
FIG. 19 is a block diagram showing another embodiment.

FIG. 19 shows still another embodiment. The basic concept of the present embodiment is to determine whether or not an image picked up is moved in addition to determining whether or not there is a high luminance (saturated) area having an area of not less than a predetermined area in the image. Only when there is a high luminance area having an area of not less than a predetermined area and the image fails to be moved by not less than a predetermined amount, two images are inlaid by synthesis.

An image of a subject formed on a CCD 103 through an imaging lens 101 and a diaphragm 102 is converted into a video signal by a CCD 103, and is converted into digital image data by an A/D converter 104, to be applied to an image data processing circuit 105, The image data processing circuit 105 includes at least two buffer memories (field memories or frame memories). As in the embodiment shown in FIG. 16, the exposure time of the CCD 103 is usually constant (for example, 1/60 seconds or 1/30 seconds), and the diaphragm 102 is so controlled by an exposure control circuit 109 that a main subject is properly exposed on the basis of photometric data.

Image data representing a field image or a frame image picked up by the CCD 103 for each constant time (for example, 1/60 seconds or 1/30 seconds) are alternately stored in the two buffer memories in the image data processing circuit 105. A movement detecting circuit 106 detects the movement of the subject picked up using the image data in the two buffer memories in accordance with known techniques such as field correlation, frame correlation and the like, to generate a movement detection signal when the amount of the detected movement is not less than a predetermined threshold value. A high luminance area detecting circuit 105 extracts high luminance image data at a level of not less than a predetermined level, similarly to the judgment control circuit 93 shown in FIG. 18, on the basis of the image data in either one of the two buffer memories (which is preferably the newest image data) and judges whether or not the area of the high luminance image data is enlarged to not less than a predetermined area, to Generate a high luminance area detection signal if there is a high luminance area having an area of not less than a predetermined area.

When the movement detection signal is not outputted from the movement detecting circuit 106 and the high luminance area detection signal is outputted from the high luminance area detecting circuit 107, a command to synthesize images is issued from an AND gate 108, to be applied to the exposure control circuit 109 and a synthesizing circuit 110. The exposure control circuit 109 sets the exposure time of an electronic shutter in the CCD 103 to approximately one-half to one-fourth of the above described constant time in response to the command to synthesize images. Image data obtained by imaging under exposure made for this exposure time is stored in either one of the above described buffer memories (which is preferably a memory storing the older image data). Thereafter, the synthesizing circuit 110 performs the above described inlaying synthesis processing using the image data in the two buffer memories, to output composite image data.

When the movement is detected or the high luminance area is not detected, the newest image data in the buffer memory is directly outputted through the synthesizing circuit 110.

The above described concept is applicable to a still video camera, a movie video camera, and a movie/still video camera.

In the still video camera, the arrangement shown in FIG. 19 is adopted without any modification. The above described operation is preferably started when a shutter release button is depressed. Composite image data is subjected to compression processing to be recorded on a memory card or is converted into an analog video signal by a D/A converter to be outputted. Alternately, the analog video signal is frequency-modulated, to be recorded on a magnetic recording medium.

When the concept is applied to the movie video camera, the CCD 103 is alternately exposed for a constant time (1/60 seconds or 1/30 seconds) and for a time which is one-half to one-fourth of the constant time so long as the movement is not detected and a high luminance area is detected. Image data obtained under the conditions of a large amount of exposure and image data obtained under the conditions of a small amount of exposure are alternately stored in two buffer memories. Accordingly, every time the image data are stored in both the memories, they can be synthesized. Composite image data obtained is converted into an analog video signal and is frequency-modulated, to be recorded on a magnetic tape. Alternately, there are two CCDs, so that synthesis processing is performed using the analog video signal, as shown in FIG. 10. Digital image data is used only in the movement detection processing and the high luminance area detection processing.

When the concept is applied to the movie still video camera, an analog video signal is usually frequency-modulated, to be recorded on a magnetic tape, as shown in FIG. 16. When a shutter release button is depressed, the circuitry shown in FIG. 19 is operated, to obtain composite image data for one field or one frame. The composite image data is converted into an analog video signal and then, is recorded on a suitable video track of the magnetic tape or is PCM-recorded on a PCM track thereof as described later.

However, image synthesis processing need not be necessarily performed in the camera. As in the embodiment shown in FIG. 16, image data obtained under the conditions of a small amount of exposure may be recorded on a magnetic tape.

In such a manner, only images which did not move or hardly move are inlaid by synthesis.

It goes without saying that it may be judged by only the movement detection processing whether or not synthesis processing should be performed or that it may be judged by only the high luminance area detection processing whether or not synthesis processing is required. It goes without saying that the function of a part of the circuitry shown in FIG. 19 can be also realized by software.

Figure 20:
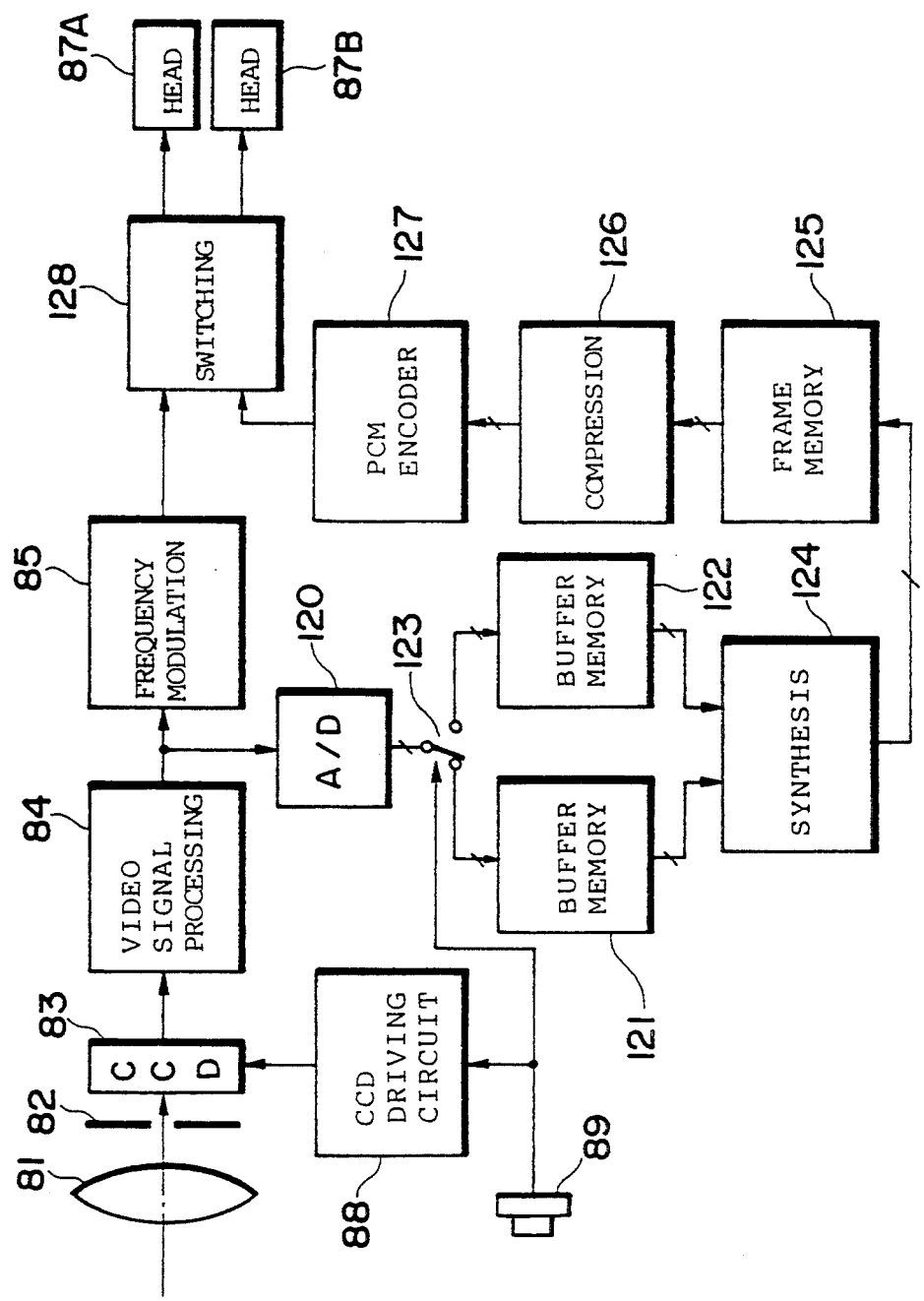
FIG. 20 is a block diagram showing an embodiment in which composite image data is PCM-recorded.

FIG. 20 shows the last embodiment concerning inlaying synthesis, in which the present embodiment is applied to the movie/still video camera. In FIG. 20, the same portions as those shown in FIG. 16 are assigned the same reference numerals and hence, the overlapped description is avoided.

Figure 21:
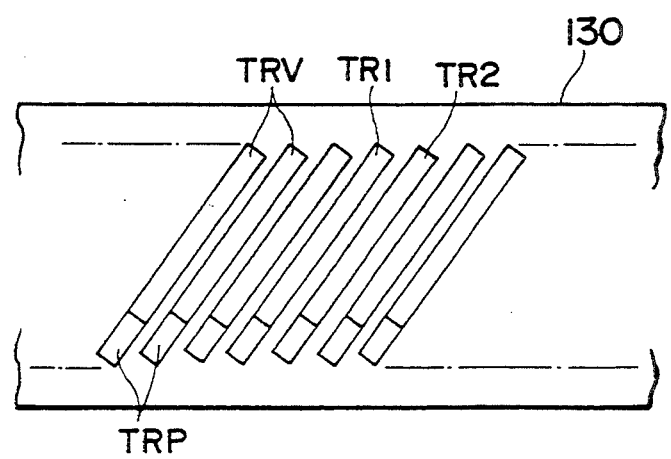
FIG. 21 illustrates a video track and a PCM track of a magnetic tape.

The present embodiment uses a movie/still video camera in which a track obliquely provided for a magnetic tape 130 is divided into a video track TRV and a PCM track TRP (PCM: Pulse Code Modulation), as shown in FIG. 21, and signals can be separately recorded on the tracks TRV and TRP by two magnetic heads 87A and 87B. Such a movie/still video camera is disclosed in Japanese Patent Application Laid Open (Kokai) publication No. 63-9378. In this publication, PCM still image data is recorded on the PCM track TRP. A video signal along one horizontal scanning line is recorded per one PCM track.

In the present embodiment, image data representing a still image obtained by synthesis is recorded on the PCM track TRP. When recording of a frequency-modulated video signal on the video track TRV by one of the magnetic heads 87A is terminated, PCM recording on the subsequent PCM track TRV is made by the other magnetic head 87B. The magnetic heads 87A and 87B alternately repeat recording on the video track TRV and recording on the PCM track TRP. A switching circuit 128 is so operated as to alternately switch the frequency-modulated video signal applied from a frequency modulating circuit 85 and a PCM signal representing the composite still image applied from a PCM, encoder 127 as described later, to apply the same to the magnetic heads 87A and 87B.

In a normal movie mode, no PCM image signal is outputted from the PCM encoder 127. Accordingly, only the frequency-modulated video signal outputted from the frequency modulating circuit 85 is recorded on the video track TRV. No video signal is particularly recorded on the PCM track TRP.

When a shutter release button 89 is depressed, a video signal for one field (or one frame) immediately after the depression is converted into digital image data (first image data) by an A/D converter 120, to be stored in a buffer memory 121 through a selecting switch 123. This video signal is also frequency-modulated, to be recorded on a video track TR1 of the magnetic tape 130.

The exposure time of an electronic shutter in a CCD 83 is shortened to one-half to one-fourth of the exposure time (1/60 seconds or 1/30 seconds) in the movie mode by a CCD driving circuit 88 so as to perform imaging for one field (or one frame) subsequent to the one field (or one frame). A video signal imaged under the conditions of a small amount of exposure is frequency-modulated and then, is recorded on a video track TR2 subsequent to the video track TR1 of the magnetic tape 130 and is converted into digital image data (second image data) by the A/D converter 120, to be stored in a buffer memory 122 through the selecting switch 123 (the selecting switch is switched at this time).

Thereafter, the camera is returned to the normal movie mode again.

The first image data obtained under the conditions of large amount of exposure stored in the buffer memory 121 and the second image data obtained under the conditions of a small amount of exposure stored in the buffer memory 122 are inlaid by synthesis by the above described method in a synthesizing circuit 124, to be temporarily stored in a frame memory 125. Composite image data stored in the frame memory 125 is subjected to data compression processing in a compressing circuit 126 and then, is applied to the PCM encoder 127. The composite image data is pulse code-modulated in the PCM encoder 127, to be inputted to the switching circuit 128. The composite image data is recorded on the PCM track TRP in small amounts at a time, as described above. The data compressing circuit 126 is not necessarily required.

As described in the foregoing, the composite still image data is divided and recorded on the PCM track of the magnetic tape in predetermined amounts at a time.

It goes without saying that it is possible to obtain first and second image data generated under the conditions of different amounts of exposure by making the amounts of strobe light different from each other in imaging of images for two fields (or two frames), as described with reference to the embodiment shown in FIG. 5, in place of changing the exposure time of the CCD 83.

PCM recording of the second image data before synthesis (and the first image data, if necessary) may be made on the PCM track without performing synthesis processing of the image data in the camera.

An embodiment of the present invention also discloses a solid-state electronic imaging device capable of obtaining two image signals generated under the conditions of different amounts of exposure without making exposure twice as described above.

Figure 22:
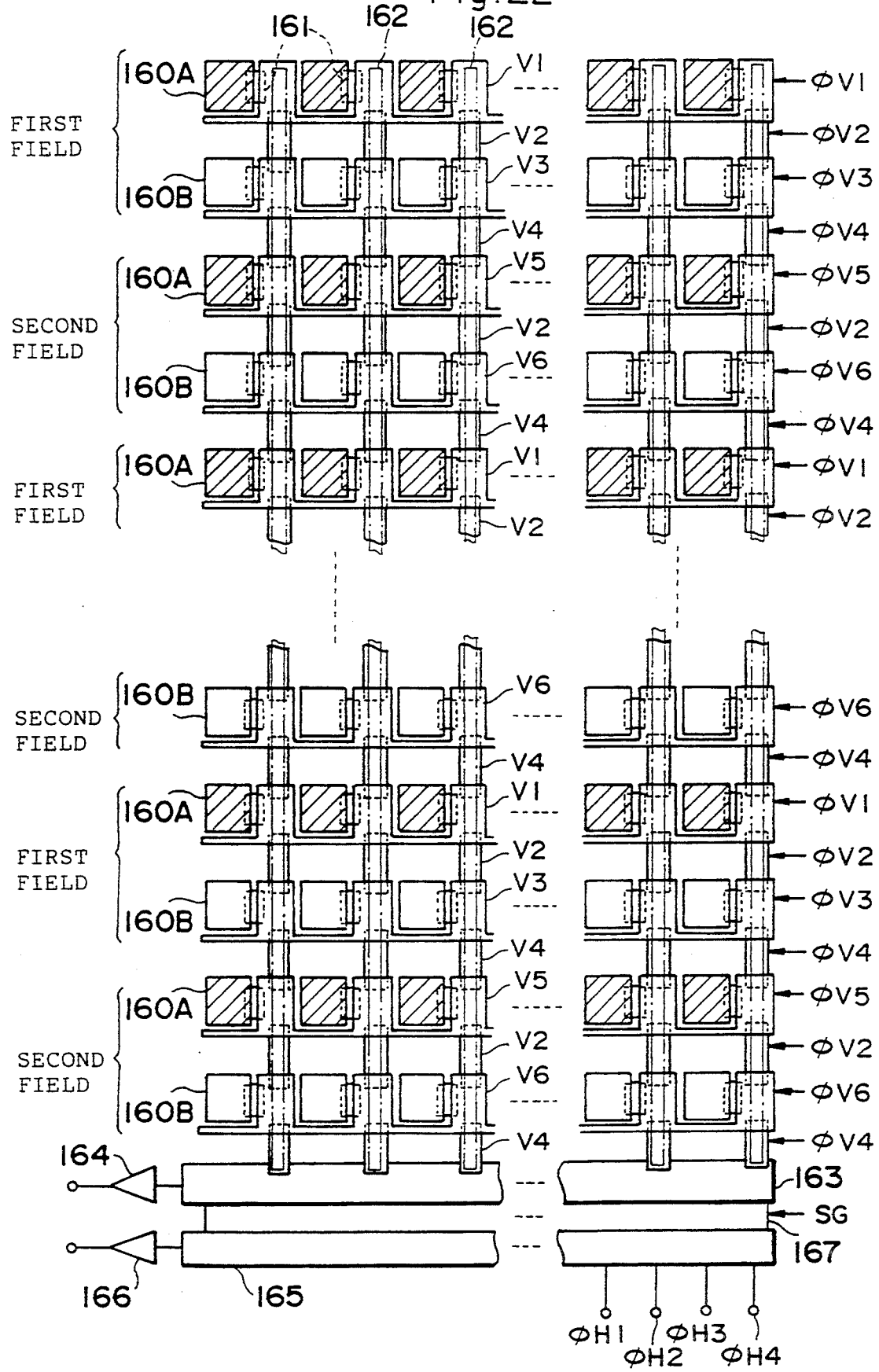
FIG. 22 is a schematic diagram of a CCD, which is an embodiment of a solid-state electronic imaging device according to the present invention.

FIG. 22 is a schematic diagram showing a CCD, which is an embodiment of a solid-state electronic imaging device according to the present embodiment. Two types of video signals generated under the conditions of different amounts of exposure are obtained from the CCD shown in FIG. 22 even if exposure is not made twice and can be utilized for the above described inlaying synthesis processing.

A plurality of photodiodes 160A and 160B are arranged over a plurality of rows and columns in the vertical direction and the horizontal direction. Filters indicated by hatching are provided on light receiving surfaces of the photodiodes 160A in every other row. This filter is one for limiting the amount of light incident on the photodiode 160A. The transmittance of the filter is so set that the ratio of the amounts of light received on the photodiode 160A provided with a filter and on the photodiode 160B provided without any filter is 1 versus 5 if the embodiment shown in FIG. 10 is taken as an example. A signal charge accumulated in the photodiodes 160A provided with filters is a first signal charge, and this first signal charge is read out from the CCD, to be a first video signal obtained under the conditions of a relatively small amount of exposure. A signal charge accumulated in the photodiodes 160B provided without any filters is second signal charge, and this second signal charge is read out from the CCD, to be a second video signal obtained under the conditions of a relatively large amount of exposure.

An image for a first field which is relatively dark (of the first video signal) is represented by a signal charge accumulated in the photodiodes 160A in the (4n+1)-th (n: positive integer) row, and an image for a second field which is relatively dark is represented by a signal charge accumulated in the photodiodes 160A in the (4n+3)-th row. An image for a first field which is relatively bright (of a second video signal) is represented by a signal charge accumulated in the photodiodes 160B in the (4n+2)-th row, and an image for a second field which is relatively bright is represented by a signal charge accumulated in the photodiodes 160B in the (4n+4)-th row.

An electrode V1 is formed adjacent to the right side (in FIG. 22) of each of the photodiodes 160A in the (4n+1)-th row, and an electrode V3 is formed adjacent to the right side of each of the photodiodes 160B in the (4n+2)-th row. An electrode V5 is formed adjacent to the right side of each of the photodiodes 160A in the (4n+3)-th row, and an electrode V6 is formed adjacent to the right side of each of the the photodiodes 160B in the (4n+4)-th row. In addition, an electrode V2 and an electrode V4 are respectively formed between the electrodes V1 and V3 and between the electrodes V3 and V5 in the vertical direction. Potential wells 161 are formed between the photodiode 160A and the electrode V1 or V5 adjacent thereto and between the photodiode 160B and the electrode V3 or V6 adjacent thereto. Field shift pulses are applied to the potential wells 161, so that the signal charge accumulated in the photodiodes 160A and the signal charge accumulated in the photodiodes 160B are respectively shifted to vertical transfer paths 162 adjacent to the right side of the potential wells 161.

Each of electrodes V1 to V6 are electrically connected to each other in the horizontal direction, while being insulated from each other in the vertical direction. Vertical transfer pulses V1, V2, V3, V4, V5 and V6 are respectively applied to the electrodes V1, V2, V3, V4, V5 and V6.

The vertical transfer paths 162 are formed directly beneath the electrodes V1 to V6 periodically arranged by applying voltages to the electrodes V1 to V6, so that the signal charge is transferred in the vertical direction, as described later.

The CCD includes a first horizontal transfer path 163 for transferring the first signal charge in the horizontal direction to output the first video signal obtained under the conditions of a relatively small amount of exposure, and a second horizontal transfer path 165 for transferring the second signal charge in the horizontal direction to output the second video signal obtained under the conditions of a relatively large amount of exposure.

The first horizontal transfer path 163 is formed below the electrode V4 in the lowermost stage out of the electrodes V1 to V6 (in FIG. 22), and the second horizontal transfer path 165 is formed below the first horizontal transfer path 163. A shift gate 167 is formed between the first horizontal transfer path 163 and the second horizontal transfer path 165. Shift gate pulses are applied to the shift gate 167, so that the signal charge in the first horizontal transfer path 163 is transferred to the second horizontal transfer path 165.

An amplifier 164 is connected to the output side of the first horizontal transfer path 163, and an amplifier 166 is connected to the output side of the second horizontal transfer path 165. Horizontal transfer pulses H1 to H4 are applied to the first horizontal transfer path 163 and the second horizontal transfer path 165. In response to the horizontal transfer pulses H1 to H4, the first signal charge is sequentially transferred through the first horizontal transfer path 163, to be outputted through the amplifier 164, and the second signal charge is sequentially transferred through the second horizontal transfer path 165, to be outputted through the amplifier 166.

Figure 23:
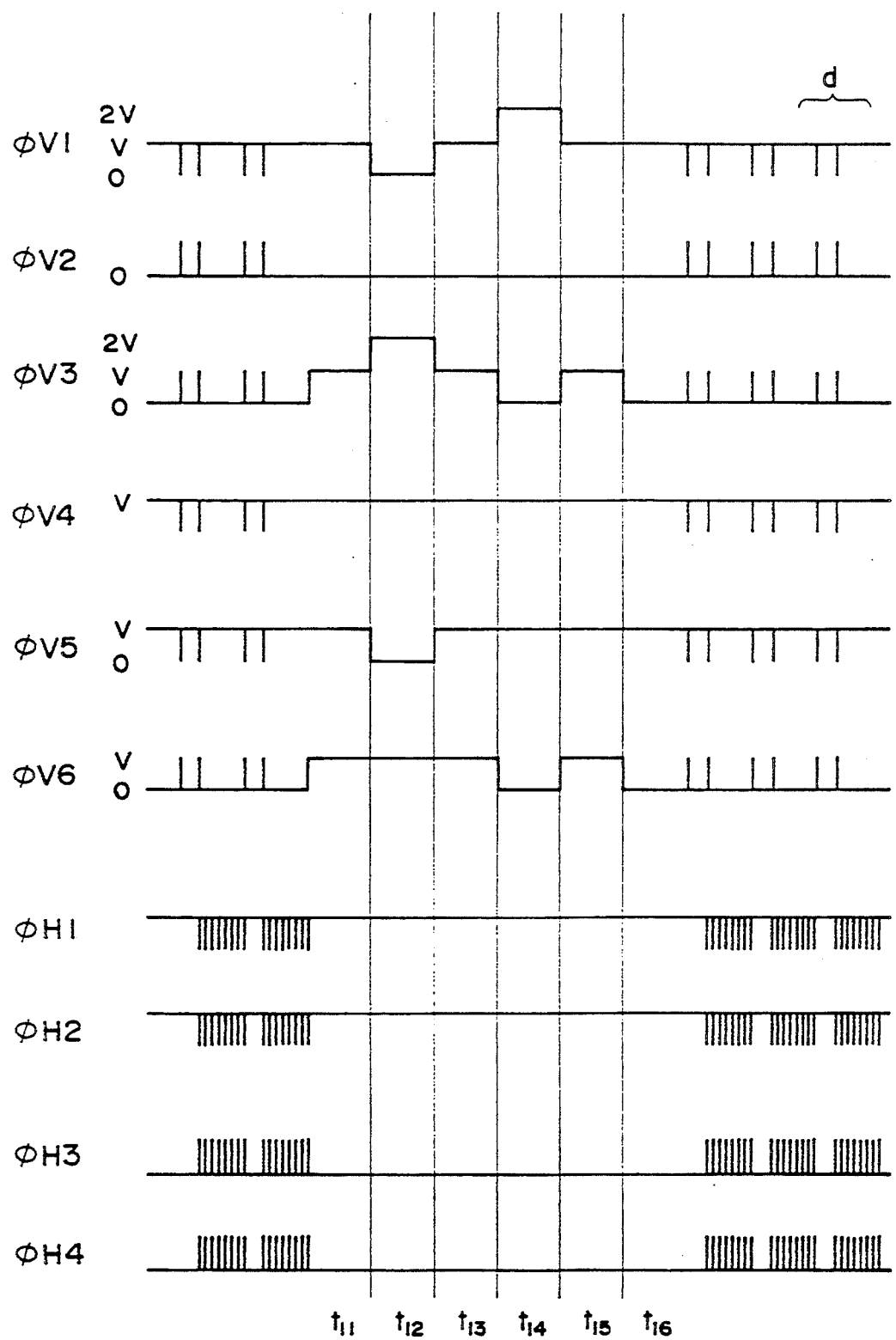
FIG. 23 is a timing chart showing transfer of signal charge.
Figure 24:
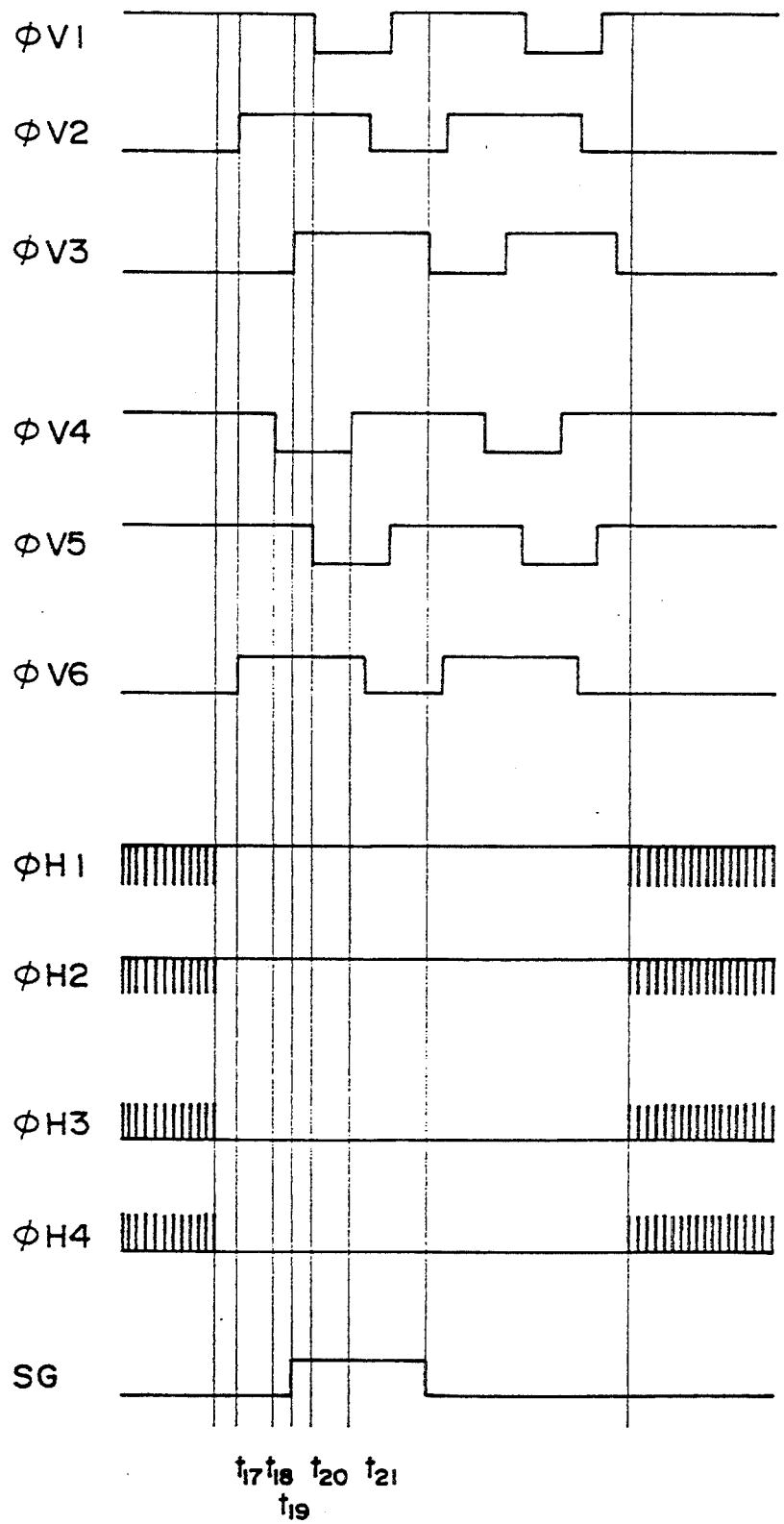
FIG. 24 is a partially enlarged view of the timing chart shown in FIG. 23.
Figure 25:
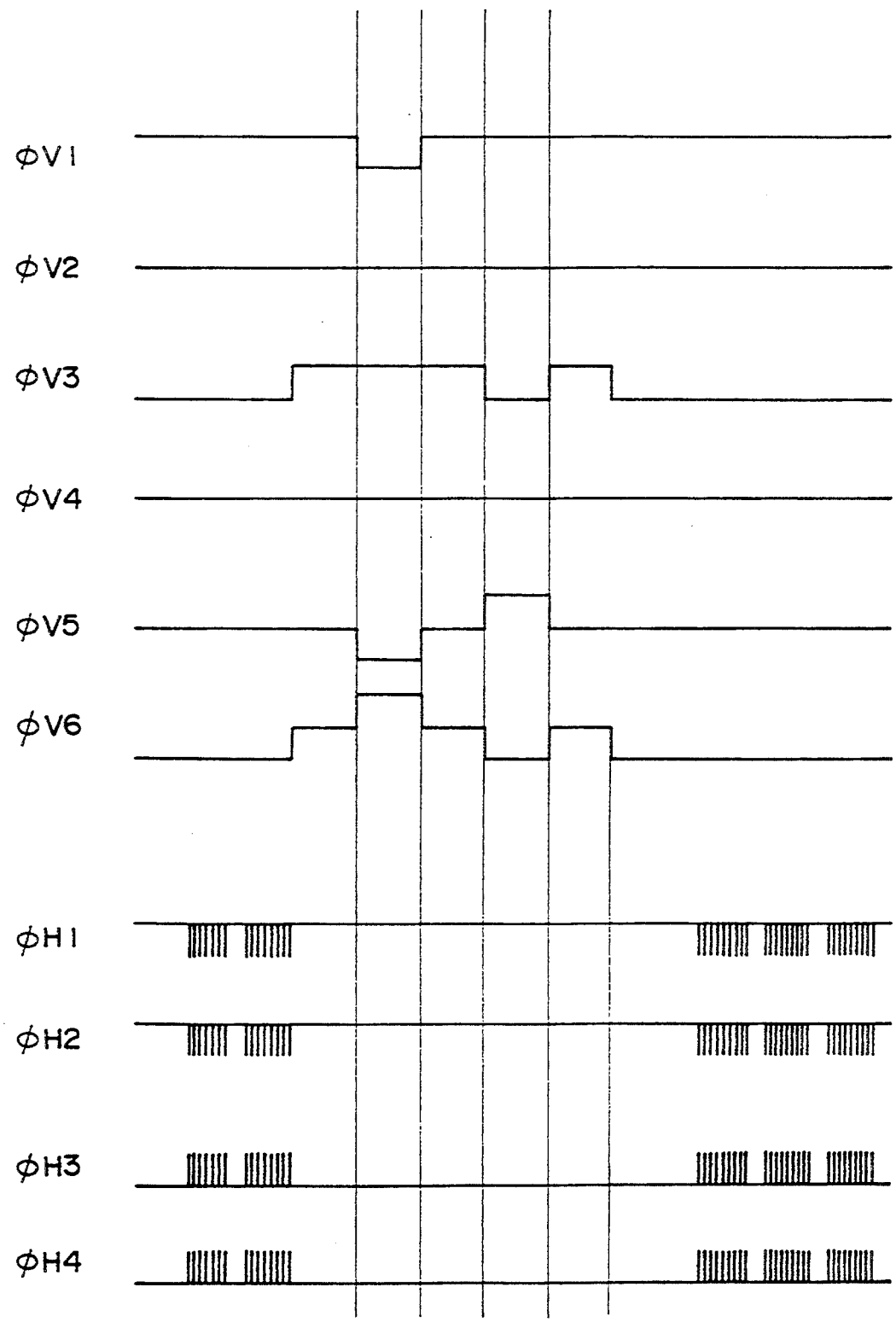
FIG. 25 is a timing chart showing transfer of signal charge.
Figure 26:
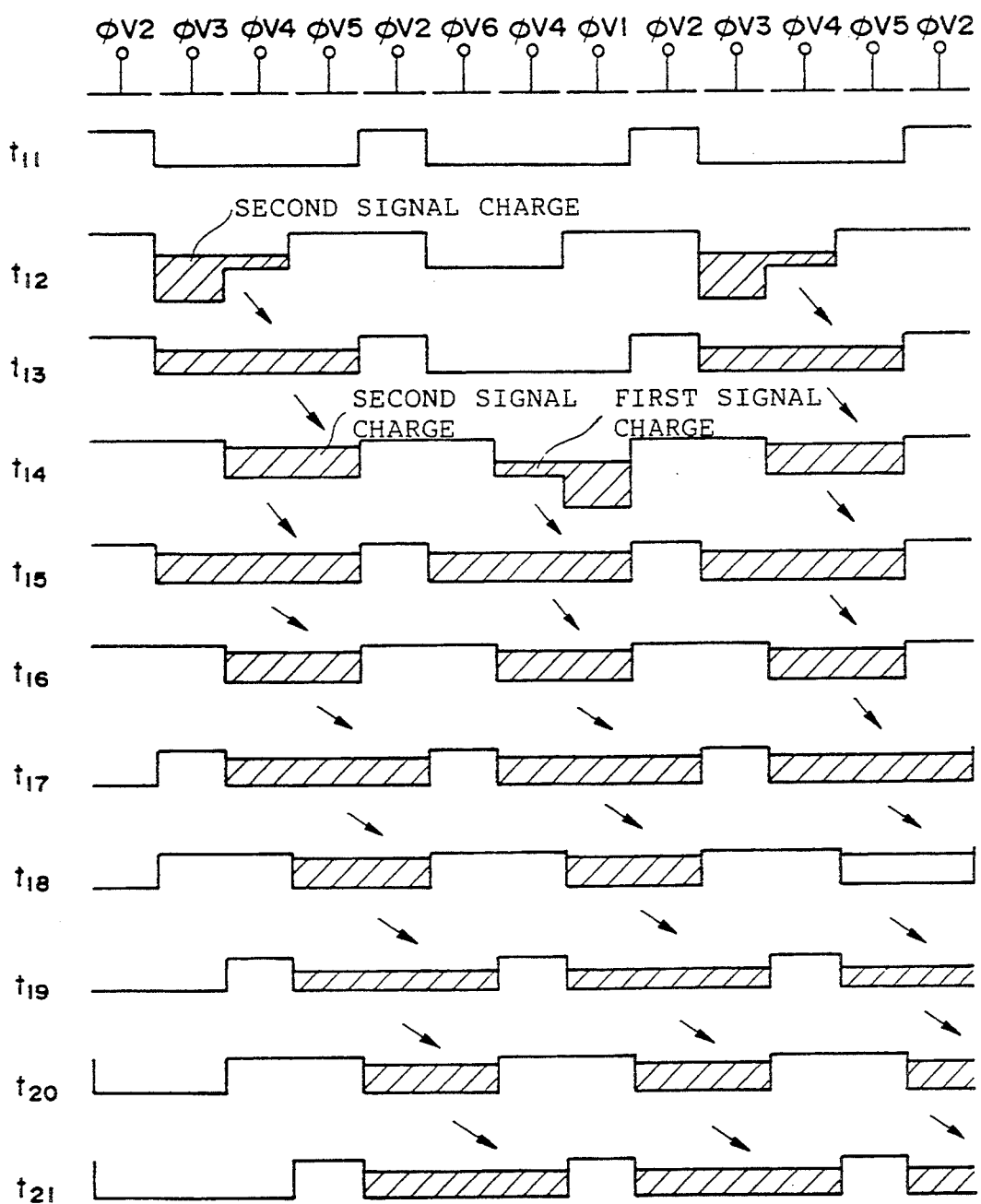
FIG. 26 shows how signal charge is transferred.

FIG. 23 is a timing chart in a case where the first signal charge and the second signal charge accumulated in the photodiodes 160A and 160B which are used to constitute an image for the first field are shifted to the vertical transfer paths 162, particularly showing a time period between the time $t_{11}$ to the time $t_{16}$ in an enlarged manner. FIG. 24 shows a time period in a portion indicated by a sign d in FIG. 23 in an enlarged manner, showing how the signal charge is vertically transferred through the vertical transfer paths 162. FIG. 25 is a timing chart in a case where the first signal charge and the second signal charge accumulated in the photodiodes 160A and 160B which are used to constitute an image for the second field are shifted to the vertical transfer paths 162, which corresponds to FIG. 23. FIG. 26 is a schematic diagram showing how the signal charge is shifted from the photodiodes 160A and 160B to the vertical transfer paths 162 and is further vertically transferred through the vertical transfer paths 162, where the signal charge is indicated by hatching.

Referring to FIGS. 22, 23, 24 and 26, a description is made of a reading operation of the first signal charge and the second signal charge accumulated in the photodiodes 160A and 160B for constituting the image for the first field.

Unnecessary charge accumulated in the photodiodes 160A and 160B is read out and then, a subject is picked up, so that a signal charge representing an image of the subject picked up is accumulated in the photodiodes 160A and 160B.

When the signal charge is read out for the first field, the field shift pulses are respectively applied to the potential wells 161 formed between the electrodes V1 and the photodiodes 160A in the (4n+1)-th row and the potential wells 161 formed between the electrodes V3 and the photodiodes 160B in the (4n+2)-th row. Consequently, the first signal charge accumulated in the photodiodes 160A in the (4n+1)-th row and the second signal charge accumulated in the photodiodes 160B in the (4n+2)-th row are respectively shifted to the vertical transfer paths 162.

The first signal charge and the second signal charge shifted to the vertical transfer paths 162 are transferred downward through the vertical transfer paths 162 by the application of the vertical transfer pulses V1 to V6 to the electrodes V1 to V6. The first signal charge is applied to the first horizontal transfer path 163, and the second signal charge is transferred to the second horizontal transfer path 165 through the first horizontal transfer path 163 and the shift Gate 167.

All the first signal charge accumulated in the photodiodes 160A for constituting the image for the first field is read out from the first horizontal transfer path 163, to obtain the first video signal generated under the condition of a relatively small amount of exposure. All the second signal charge accumulated in the photodiodes 160B for constituting the image for the first field is read out from the second horizontal transfer path 165, to obtain the second video signal generated under the conditions of a relatively large amount of exposure.

The above described first video signal and second video signal are read out within one field period. When reading of the video signals for the first field is terminated in such a manner, reading of video signals for the second field is started. The video signals for the second field are read out in the same manner as the video signals for the first field.

The reading of the first signal charge and the second signal charge will be described more concretely with reference to the timing charts (FIGS. 23, 24 and 26).

At the time $t_{11}$, a voltage of V [V] is applied to the electrodes V1, V3, V4, V5 and V6. At the time $t_{12}$, a voltage of V [V] is then applied to the electrodes V4 and V6, and a voltage of 2 V [V] is applied to the electrode V3. Consequently, the second signal charge accumulated in the photodiodes 160B for the first field is moved from the photodiodes 160B to the potential wells of the vertical transfer paths 162 formed beneath the electrodes V3 and V4.

At the time $t_{13}$, a voltage of V [V] is also applied to the electrode V5, so that the second signal charge is moved to the potential wells of the vertical transfer paths 162 formed beneath the electrodes V3, V4 and V5.

At the time $t_{14}$, a voltage of 2V [V] is applied to the electrode V1. Consequently, the first signal charge accumulated in the photodiodes 160A for the first field is moved from the photodiodes 160A to the potential wells of the vertical transfer paths 162 formed beneath the electrodes V4 and V1.

In the following time, a voltage of V [V] is applied to the electrodes V1, V3, V4, V5 and V6 at the time $t_{15}$, a voltage of V [V] is applied to the electrodes V1, V4 and V5 at the time $t_{16}$, and a voltage of V [V] is applied to the electrodes V1, V2, V4 and V5 at the time $t_{17}$.

Furthermore, a voltage of V [V] is applied to the electrodes V1, V2 and V5 at the time $t_{18}$, and a voltage of V [V] is applied to the electrodes V1, V2, V3, V5 and V6 at the time $t_{17}$. In addition, a voltage of V [V] is applied to the electrodes V2, V3 and V6 at the time $t_{20}$, and a voltage of V [V] is applied to the electrodes V2, V3, V4 and V6 at the time $t_{21}$. A combination of the electrodes to which a voltage is applied is thus changed so that the potential wells of the vertical transfer paths 162 formed beneath these electrodes are moved. Accordingly, the first signal charge and the second signal charge accumulated in the potential wells are transferred as the potential wells are moved.

Since a potential barrier always exists between the first signal charge and the second signal charge, the first signal charge and the second signal charge are sequentially transferred downward through the vertical transfer paths 162 without being mixed with each other.

The second signal charge read out from the photodiodes 160B out of the first signal charge and the second signal charge sequentially transferred through the vertical transfer paths 162 first reaches the first horizontal transfer path 163. At this time, the shift gate pulses are applied to the shift gate 167, so that the second signal charge fed to the first horizontal transfer path 163 is further transferred to the second horizontal transfer path 165.

When the second signal charge is transferred to the second horizontal transfer path 165, the first signal charge read out from the photodiodes 160A reaches the first horizontal transfer path 163. Since the horizontal transfer pulses H1 to H4 are applied to the first horizontal transfer path 163 and the second transfer path 165, the first signal charge and the second signal charge are horizontally transferred through the transfer paths 163 and 165, respectively, to be outputted through the amplifiers 164 and 165.

When the reading of the first signal charge and the second signal charge read out from the photodiodes 160A and 160B in one row is terminated, the first signal charge and the second signal charge accumulated in the photodiodes 160A and 160B in the next row respectively reach the first horizontal transfer path 163 and the second horizontal transfer path 165 from the vertical transfer paths 162, to be horizontally transferred and outputted in the same manner. Similarly in the following time, the first signal charge and the second signal charge accumulated in the photodiodes 160A and 160B in all rows are read out from the first horizontal transfer path 163 and the second horizontal transfer path 165.

When the reading of the first signal charge and the second signal charge accumulated in the photodiodes 160A and 160B for the first field are terminated, the first signal charge and the second signal charge accumulated in the photodiodes 160A and 160B for the second field are read out. The first signal charge and the second signal charge accumulated in the photodiodes 160A and 160B for the second field are read out by the application of the vertical transfer pulses V1 to V6 to the vertical transfer paths 162 and the application of the horizontal transfer pulses to the horizontal transfer paths 163 and 165, in accordance with the timing chart of FIG. 25. The reading of the signal charge for the second field is almost the same as the reading of the signal charge for the first field and hence, the description thereof is omitted.

Even if exposure is not made twice, the first video signal representing a relatively dark image obtained by limiting the amount of incident light by the filters is outputted from the first horizontal transfer path 163 included in the single chip CCD, and the second video signal representing a relatively bright image is outputted from the second horizontal transfer path 165 included therein. Consequently, two types of video signals generated under the conditions of different amounts of exposure are obtained. Filters having different transmittance from that of the filters provided on the photodiodes 160A may be provided on the photodiodes 160B.

Figure 27:
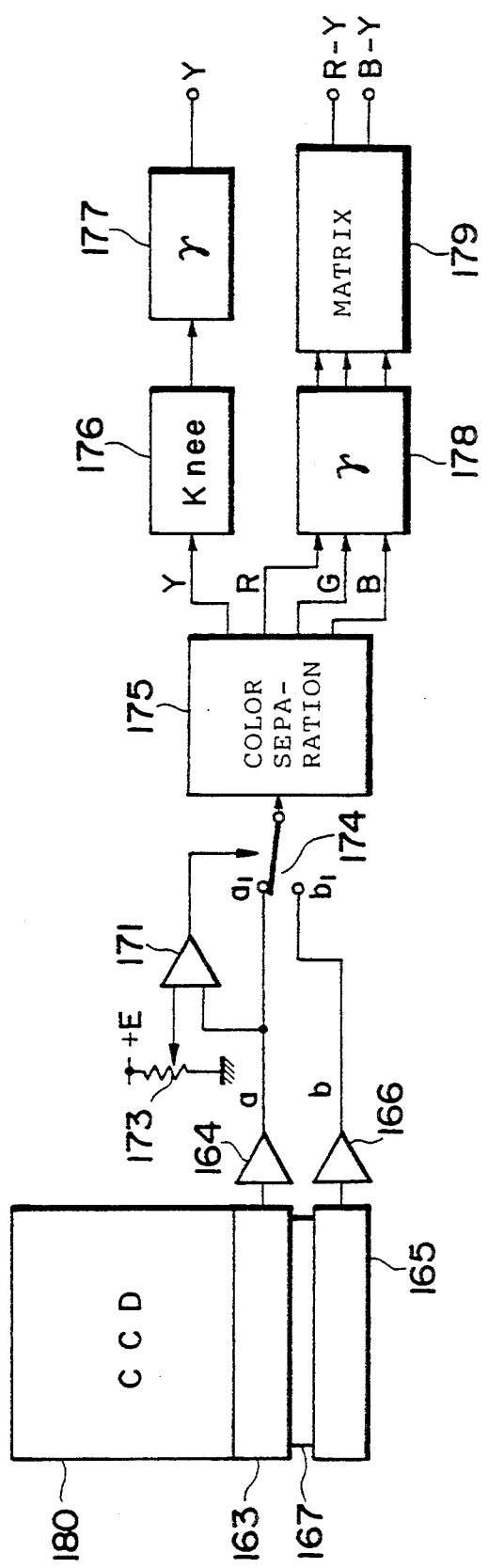
FIG. 27 shows circuitry for processing video signals obtained by the CCD shown in FIG. 22 in an embodiment of the present invention.
Figure 28A:
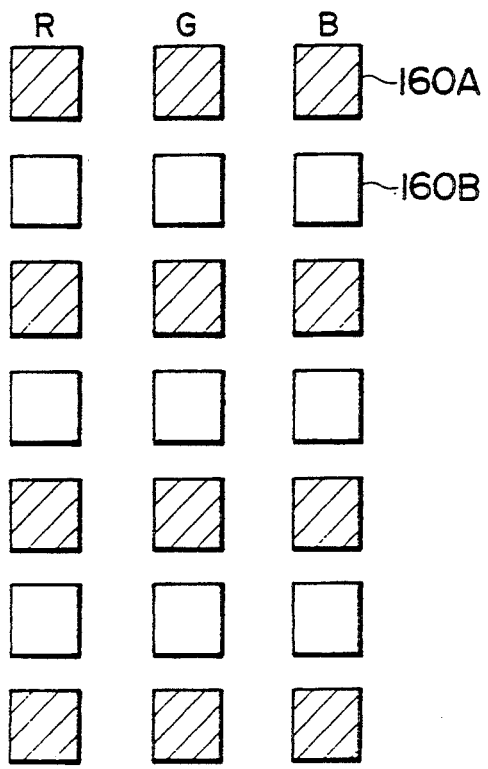
FIG. 28a illustrates the arrangement of stripe filters.
Figure 28B:
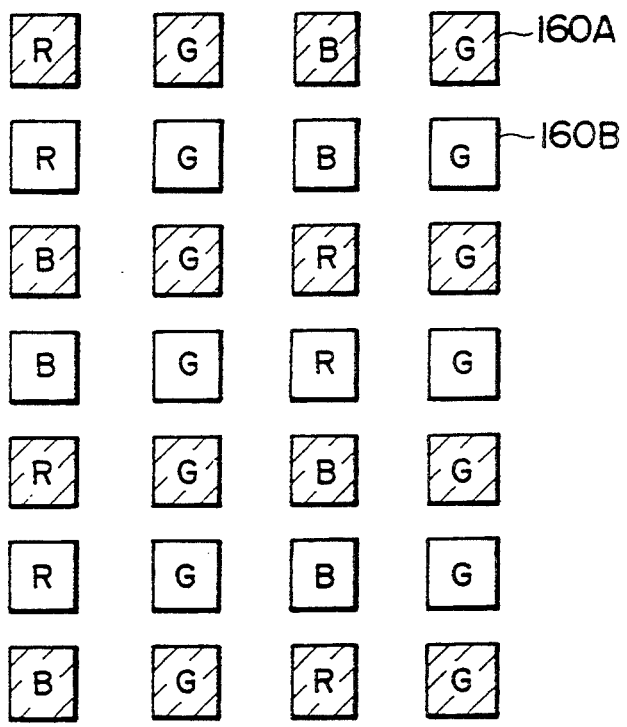
FIG. 28b illustrates the arrangement of mosaic filters for an embodiment of the present invention.

FIG. 27 shows circuitry for processing analog video signals obtained from the two types of horizontal transfer paths., as described above. FIGS. 28a and 28b show the arrangement of color filters R, G and B in the CCD, where FIG. 28a illustrates stripe filters R, G and B whose arrangement varies for each row, and FIG. 28b illustrates mosaic filters R, G and B. In this CCD, the transmittance of the color filters provided for the photodiodes 160A is set to be lower than that of the color filters provided for the photodiodes 160B, so that the amount of light incident on the photodiodes 160A in every other row is limited.

The first video signal representing a relatively dark color image outputted from the first horizontal transfer path 163 is amplified in the amplifier 164. An output of the amplifier 164 is represented by an output signal a. On the other hand, the second video signal representing a relatively bright color image outputted from the second horizontal transfer path 165 is amplified in the amplifier 166. An output of the amplifier 166 is represented by an output signal b.

The output signal a of the amplifier 164 is applied to one input terminal of a comparator 171 and an $a_1$ terminal of a selecting switch 174. The output signal b of the amplifier 166 is applied to a $b_1$ terminal of the selecting switch 174.

A threshold voltage obtained from a variable resistor 173, which has a predetermined voltage E applied thereto, is applied to the other input terminal of the comparator 171. The selecting switch 174 is so controlled that the $a_1$ terminal is rendered conductive unless a voltage of the input signal a of the comparator 171 exceeds the threshold voltage, while the $b_1$ terminal is rendered conductive if it exceeds the threshold voltage. Consequently, an output of the selecting switch 174 is an output signal a when it is not more than the threshold voltage, while being an output signal b when it is not less than the threshold value. Consequently, the two video signals are synthesized. That is, inlaying synthesis processing is performed. An output signal of the selecting switch 174 is applied to a color separating circuit 175.

The color separating circuit 175 is one for generating or separating a luminance signal Y as well as chrominance signals R, G and B from the inputted color video signal to output the signals. The luminance signal Y is applied to a knee circuit 176, and the chrominance signals R, G and B are applied to a gamma correcting circuit 177.

In the knee circuit 176, the luminance signal Y is subjected to knee processing, to be applied to a gamma correcting circuit 177. In the gamma correcting circuit 177, the inputted luminance signal is subjected to a gamma correction, to be outputted.

The chrominance signals R, G and B inputted to the gamma correcting circuit 178 are also subjected to a Gamma correction, to be applied to a matrix circuit 179. The matrix circuit 179 is a circuit for generating color difference signals R-Y and B-Y from the inputted chrominance signals R, G and B. The generated color difference signals R-Y and B-Y are outputted from the matrix circuit 179.

An inlaid composite image is reproduced and displayed using the luminance signal Y outputted from the Gamma correcting circuit 177 as well as the color difference signals R-Y and B-Y outputed from the matrix circuit 179. Alternatively, the signals are recorded on a recording medium.

Figure 29:
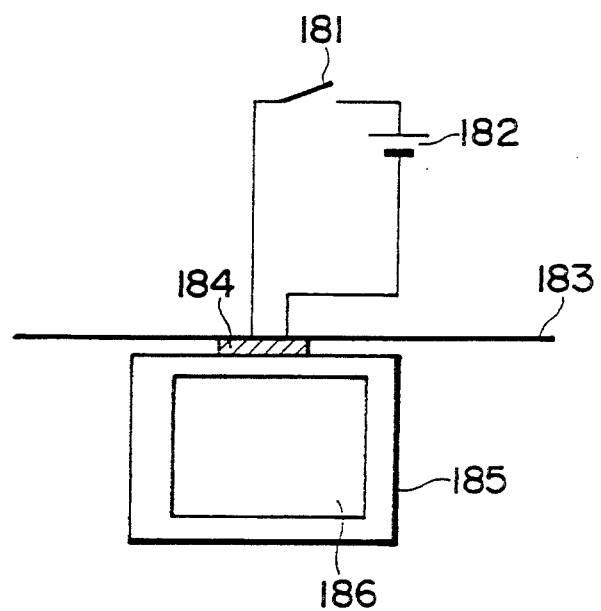
FIG. 29 illustrates a circuit for moving the CCD in en embodiment of the present invention.
Figure 30B:
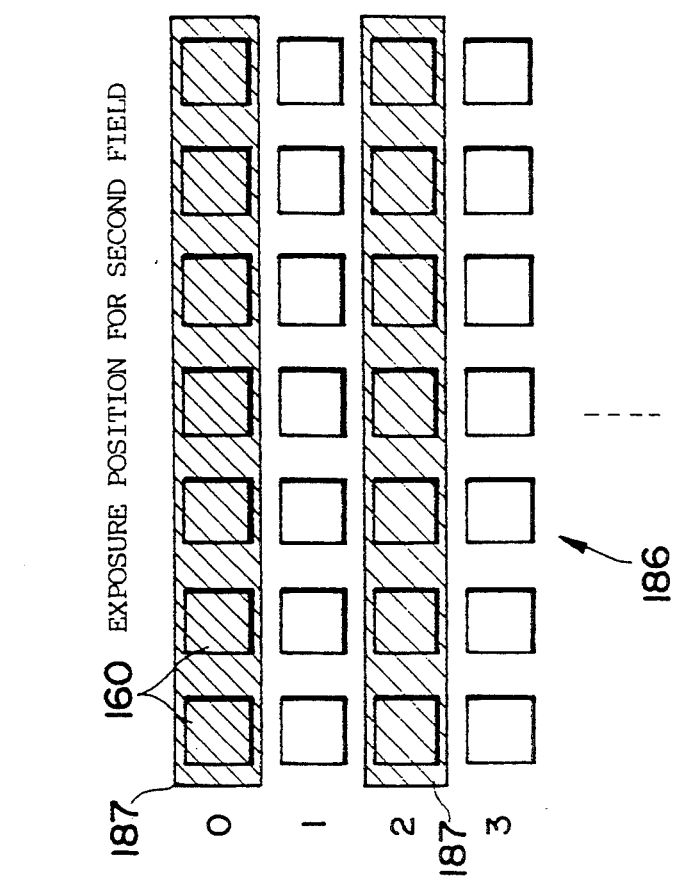
FIGS. 30a and FIG. 30b show how the position of the CCD is moved.
Figure 30A:
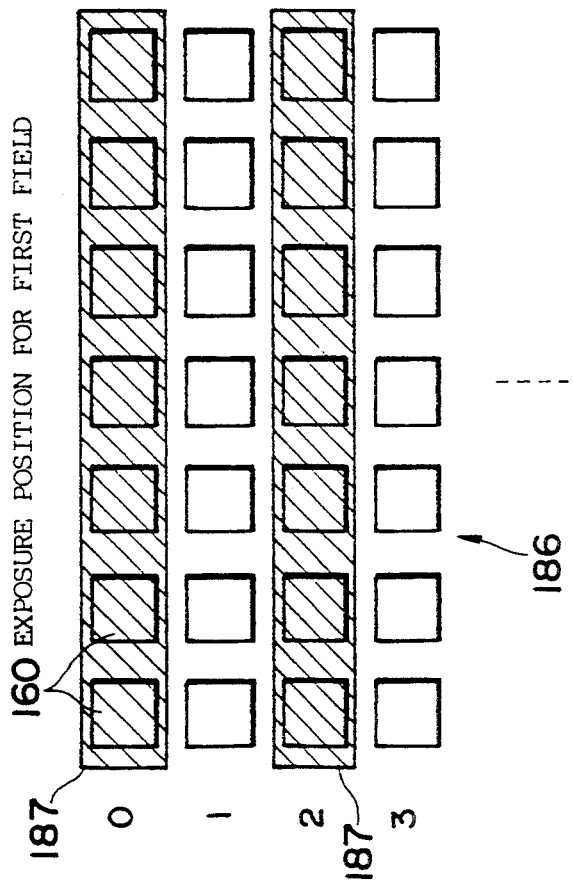

FIGS. 29, 30a and 30b show another embodiment, where FIG. 29 shows an example of a circuit for moving in the vertical direction the position where a CCD is exposed, FIG. 30a shows the position where the CCD is exposed so as to obtain an image for a first field, and FIG. 30b shows the position where the CCD is exposed so as to obtain an image for a second field.

Referring to FIG. 29, a piezoelectric element 184 is fixed to a supporting member 183. A DC voltage from a DC voltage source 182 is applied in response to an on-off operation of a switching element 181. A CCD 186 protected by a CCD package 185 is fixed to the piezoelectric element 184. The position of the CCD 186 is moved in the vertical direction by one row of photodiodes 160 depending on whether or not a voltage is applied to the piezoelectric element 184.

Referring to FIGS. 30a and 30b, filters 187 are provided on photodiodes 160 in even rows (including the 0-th row). The filter 187 is for reducing the amount of light incident on the photodiodes 160 by approximately one fifth, as in the embodiment shown in FIG. 22. A signal charge accumulated in the photodiodes 160 in odd rows and signal charge accumulated in the photodiodes 160 in even rows are separately read out, as in the embodiment shown in FIG. 22. A first video signal representing a relatively dark image is constituted by the signal charge read out from the photodiodes 160 in even rows. On the other hand, a second video signal representing a relatively bright image is constituted by the signal charge read out from the photodiodes 160 in odd rows. In FIGS. 30a and 30b, the illustration of vertical transfer paths and horizontal transfer paths is omitted.

Referring to FIG. 30a, no voltage is applied to the piezoelectric element 184 at the time of exposure for the first field. Consequently, exposure is made in the position shown in FIG. 30a. Thereafter, the signal charge accumulated in the photodiodes 160 is read out, so that the first and second video signals are outputted.

At the time of exposure for the second field subsequently made, a DC voltage is applied to the piezoelectric element 184. When the DC voltage is applied to the piezoelectric element 184, the piezoelectric element 184 is distorted. Consequently, as shown in FIG. 30b, the position of the CCD 186 is displaced in the vertical direction by one row of photodiodes 160, so that exposure for the second field is made in this position. When the exposure for the second field is terminated, the signal charge accumulated in the photodiodes 160 is read out, so that the first and second video signals are outputted.

The CCD is moved in the vertical direction by one row of photodiodes 160 using the piezoelectric element, as described above, so that a video signal obtained by limiting the amount of light by the filters 187 and a video signal obtained without limiting the amount of light are outputted. Two types of video signals generated under the conditions of different amounts of exposure are obtained by the photodiodes whose number is one-half the number of the photodiodes shown in FIG. 22. Only the filters 187 may be shifted by one row of photodiodes. In this case, for the second field, the first video signal will be obtained from the photodiodes in odd rows, and the second video signal will be obtained from the photodiodes in even rows thereof.

Although the present embodiment has been described and illustrated in detail, it is clearly understood that the same is by way of illustration and example only and is not to be taken by way of limitation, the spirit and scope of the present embodiment being limited only by the terms of the appended claims.

What is claimed is:

1. A video camera comprising:
   imaging means for successively imaging a subject using two different amounts of exposure and outputting image signals respectively representing two frames of images obtained under the conditions of different amounts of exposure;
   discriminating means for discriminating an image signal portion representing a relatively high luminance area in the frame of an image obtained under the conditions of a large amount of exposure or discriminating an image signal portion representing a relatively low luminance area in the frame of an image obtained under the conditions of a small amount of exposure by comparing the image signal with a predetermined threshold level; and
   generating means for generating a composite image signal by replacing the image signal portion representing the relatively high luminance area in the frame of an image obtained under the conditions of the large amount of exposure with an image signal portion representing a corresponding area in the frame of an image obtained under the conditions of a small amount of exposure or by replacing the image signal portion representing the relatively low luminance area in the frame of an image obtained under the conditions of the small amount of exposure with an image signal portion representing a corresponding area in the frame of an image obtained under the conditions of a large amount of exposure.

2. The video camera according to claim 1, further comprising determining means for respectively determining a proper amount of exposure for the relatively low luminance area and a proper amount of exposure for the relatively high luminance area in a visual field of the camera,
   said imaging means imaging the subject twice using the determined two types of amounts of exposure, respectively.

3. The video camera according to claim 1, wherein said imaging means comprises:
   beam splitter means for dividing incident light in accordance with a predetermined ratio of the amounts of exposure; and
   two solid-state electronic imaging devices for respectively receiving two incident light beams obtained by the division by the beam splitter means to output image signals.

4. The video camera according to claim 1, wherein said imaging means comprises:
   a solid-state electronic imaging device for outputting an image signal representing an image of the incident light; and
   driving means for driving said solid-state electronic imaging device so as to make a constant exposure time in an ordinary state and driving said solid-state electronic imaging device so as to make an exposure time shorter than said constant exposure time in response to a command to generate a composite image.

5. The video camera according to claim 1, wherein said composite image signal generating means comprises:
   a comparator for comparing a first analog video signal representing the image obtained under the conditions of a large amount of exposure with a predetermined threshold level to generate an output when the level of the first analog video signal exceeds said threshold level; and
   a multiplexer receiving said first analog video signal and a second analog video signal applied in synchronization therewith and representing the image obtained under the condition of a small amount of exposure, and selecting said first analog video signal to output the same in an ordinary state and selecting said second analog video signal to output the same when the output of said comparator is applied.

6. The video camera according to claim 5, which further comprises a low-pass filter for removing a high frequency component of said first analog video signal, an output of the low-pass filter being applied to said comparator.

7. The video camera according to claim 5, which further comprises:
a time width detecting circuit for applying an output signal of said comparator to said multiplexer when the time width of the output signal is not less than a predetermined reference width; and
a delay circuit for delaying said first and second analog video signals for a time corresponding to said reference width to respectively apply the signals to said multiplexer.

8. The video camera according to claim 1, which further comprises strobe flashing means for emitting strobe light twice, resulting in suitable amounts of exposure respectively for two areas different distances away from the camera in the visual field of the camera.

9. The video camera comprising:
imaging means for successively imaging a subject using two different amounts of exposure and outputting first and second image signals respectively representing two images obtained under the conditions of different amounts of exposure;
first storing means for storing said first image signal outputted from said imaging means and representing the image obtained under the conditions of a large amount of exposure;
second storing means for storing said second image signal outputted from said imaging means and representing the image obtained under the conditions of a small amount of exposure;
determining means for determining the relatively high luminance area in the image represented by the first image signal stored in said first storing means or the relatively low luminance area in the image represented by the second image signal stored in said second storing means; and
synthesizing means for synthesizing an image signal representing an area other than the high luminance area determined by said determining means in said first image signal and an image signal representing an area corresponding to said high luminance area in said second image signal, or synthesizing an image signal representing an area other than the low luminance area determined by said determining means in said second image signal and an image signal representing an area corresponding to said low luminance area in said first image signal.

10. The video camera according to claim 9, wherein
said determining means comprises third storing means for storing an area designation signal representing the area determined by said determining means, and
said synthesizing means comprises switching means for selecting either one of the first and second image signals synchronously read out from said first and second storing means to output the same in accordance with the area designation signal read out from said third storing means.

11. The video camera according to claim 9, wherein said determining means comprises comparing means for comparing said first image signal or said second image signal with a predetermined threshold level.

12. The video camera according to claim 9, wherein said determining means comprises:
means for low-pass filtering said first image signal or said second image signal; and
comparing means for comparing the image signal low-pass filtered with a predetermined threshold level.

13. The video camera according to claim 7, wherein said determining means defines an area of a relatively high luminance and having an area or length which fails to be less than a predetermined value in the image represented by said first image signal or an area of a relatively low luminance and having an area or length which fails to be less than a predetermined value in the image represented by said second image signal.

14. The video camera according to claim 9, wherein said synthesizing means generating means for generating, in the vicinity of the boundary appearing when the first image signal is partially replaced with the second image signal or the second image signal is partially replaced with the first image signal, a signal representing the weighed average value of both said first and second image signals.

15. The video camera according to claim 9, wherein said synthesizing means comprises means for low-pass filtering, in the vicinity of the boundary appearing when the first image signal is partically replaced with the second image signal or the second image signal is partially replaced with the first image signal, the image signals.

16. A still video camera comprising:
determining means for respectively determining a proper amount of exposure for a relatively high luminance area and a proper amount of exposure for a relatively low luminance area in a visual field of the camera;
imaging means including a solid-state electronic imaging device for imaging a subject twice using the determined two different amounts of exposure and respectively outputting video signals representing images obtained by the imaging from said solid-state electronic imaging device;
analog-to-digital converting means for respectively converting the video signals outputted from said imaging means into digital image data corresponding thereto;
first storing means for storing first digital image data obtained by the analog-to-digital conversion and representing the image obtained under the conditions of a large amount of exposure;
second storing means for storing second digital image data obtained by the analog-to-digital conversion and representing the image obtained under the conditions of a small amount of exposure;
defining means for defining the relatively high luminance area in the image represented by the first digital image data stored in said first storing means; and
image synthesizing means for generating composite image data by replacing image data representing the high luminance area defined by said defining means in said first digital image data with image data representing a corresponding area in said second digital image data stored in said second storing means.

17. A still video camera comprising:
strobe flashing means for emitting strobe light twice, resulting in suitable amounts of exposure respectively for two areas different distances away from the camera in a visual field of the camera;
imaging means for imaging a subject twice in synchronization with the emission of strobe light by said strobe flashing means to respectively output video signals representing images obtained by the imaging;

analog-to-digital converting means for respectively converting the video signals outputted from said imaging means into digital image data corresponding thereto;

first storing means for storing first digital image data obtained by the analog-to-digital conversion and representing one of the images;

second storing means for storing second digital image data obtained by the analog-to-digital conversion and representing the other image;

defining means for defining a relatively high luminance area in the image represented by the first digital image data stored in said first storing means; and image synthesizing means for generating composite image data by replacing image data representing the high luminance area defined by said defining means in said first digital image data with image data representing a corresponding area in said second digital image data stored in said second storing means.

18. A method of operating a video camera, comprising the steps of:

successively imaging a subject using two different amounts of exposure to obtain image signals respectively representing two images generated under the conditions of different amounts of exposure;

discriminating an image signal representing a relatively high luminance area in the image obtained under the conditions of a large amount of exposure or discriminating an image signal representing a relatively low luminance area in the image obtained under the conditions of a small amount of exposure by comparing the image signal with a predetermined threshold level; and generating a composite image signal by replacing the image signal representing the relatively high luminance area in the image obtained under the conditions of the large amount of exposure with an image signal representing a corresponding area in the image obtained under the conditions of the small amount of exposure or by replacing the image signal representing the relatively low luminance area in the image obtained under the conditions of the small amount of exposure with an image signal representing a corresponding area in the image obtained under the conditions of the large amount of exposure.

19. The method of operating a video camera according to claim 18, further comprising the steps of:

respectively determining a proper amount of exposure for the relatively high luminance area and a proper amount of exposure for the relatively low luminance area in a visual field of the camera; and imaging the subject twice using the determined two types of amounts of exposure to obtain two image signals generated under the conditions of different amounts of exposure.

20. The method of operating a video camera according to claim 18, further comprising the step of:

driving the solid-state electronic imaging device so as to make a constant exposure time in an ordinary state; and driving the solid-state electronic imaging device so as to make an exposure time shorter than said constant exposure time in response to a command to generate a composite image to obtain two image signals generated under the conditions of different amounts of exposure.

21. The method of operating a video camera according to claim 20, which comprises the step of detecting the movement of an image of the subject on the basis of the image signal obtained from said solid-state electronic imaging device to continue to make exposure for said constant exposure time when the image of the subject is moved by not less than a constant amount.

22. The method of operating a video camera according to claim 18, further comprising the step of emitting strobe light twice, which results in suitable amounts of exposure respectively for two areas different distances away from the camera in a visual field of the camera, to obtain two image signals.

* * * * *